US007565238B2

(12) United States Patent
Nakagawa et al.

(10) Patent No.: US 7,565,238 B2
(45) Date of Patent: Jul. 21, 2009

(54) ENGINE CONTROL DEVICE

(75) Inventors: Shinji Nakagawa, Hitachinaka (JP); Kazuhiko Kanetoshi, Hitachinaka (JP); Kozo Katogi, Hitachi (JP); Takanobu Ichihara, Naka (JP); Minoru Osuga, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/018,761

(22) Filed: Jan. 23, 2008

(65) Prior Publication Data

US 2008/0228383 A1 Sep. 18, 2008

(30) Foreign Application Priority Data

Mar. 14, 2007 (JP) ............................ 2007-064305

(51) Int. Cl.
*F02D 41/34* (2006.01)
*F02D 35/02* (2006.01)
*G06F 19/00* (2006.01)

(52) U.S. Cl. ...................................................... 701/113

(58) Field of Classification Search ................. 701/113, 701/102, 115; 123/179.15, 435, 90.15
See application file for complete search history.

(56) References Cited

U.S. PATENT DOCUMENTS 7,316,210 B2 * 1/2008 Fuwa ...................... 123/90.15
7,484,497 B2 * 2/2009 Watanabe et al. ........... 123/345

FOREIGN PATENT DOCUMENTS

JP 2002-213261 A 7/2002

* cited by examiner

*Primary Examiner*—Hieu T Vo
(74) *Attorney, Agent, or Firm*—Crowell & Moring LLP

(57) ABSTRACT

Exhaust emission control is exercised to restrict the exhaust amounts [g] of HC, CO, NOx, and the like. However, since the intake air amount for startup unduly increases due to an engine speed overshoot for startup, the exhaust amounts of HC, CO, and NOx increase excessively. Therefore, there is a need for optimizing the intake air amount for startup. The present invention proposes an engine startup control method that assures excellent startability and low exhaust emissions (small gas amount). Disclosed is an engine control device for starting an engine (from its stop state). The engine control device includes a section for setting a target engine operating state of each combustion; a section for detecting an actual engine operating state of each combustion; and a section for computing a control parameter for each subsequent combustion in accordance with the target engine operating state of each combustion and the actual engine operating state of each combustion.

18 Claims, 32 Drawing Sheets

(STARTUP CONTROL PERMISSION SECTION)

(FIRST, SECOND, AND FIFTH EMBODIMENTS)

(TARGET INCREASED ENGINE SPEED COMPUTATION SECTION)

(FRICTION TORQUE COMPUTATION SECTION)

(ACTUAL INCREASED ENGINE SPEED COMPUTATION SECTION)

(TARGET TORQUE COMPUTATION SECTION 1)

(TARGET TORQUE COMPUTATION SECTION 2)

TgFA : TARGET EQUIVALENCE RATIO (FUEL INJECTION AMOUNT COMPUTATION SECTION)

(TARGET AIR AMOUNT COMPUTATION SECTION)

(IGNITION TIMING COMPUTATION SECTION)

(TARGET INDICATED MEAN EFFECTIVE PRESSURE COMPUTATION SECTION 1)

(ACTUAL INDICATED MEAN EFFECTIVE PRESSURE COMPUTATION SECTION)

(TARGET INDICATED MEAN EFFECTIVE PRESSURE COMPUTATION SECTION 3)

TgFA : TARGET EQUIVALENCE RATIO (TARGET AIR AMOUNT COMPUTATION SECTION)

(FUEL EVAPORATION RATE DETECTION SECTION)

(FRICTION TORQUE DETECTION SECTION)

ENGINE CONTROL DEVICE

BACKGROUND OF THE INVENTION

1. Field of the Invention

The present invention relates to an engine control device, and more particularly to a control device that simultaneously assures satisfactory startup performance and exhaust performance.

2. Description of the Related Art

It is being demanded that engine exhaust emissions be further reduced in accordance with increasingly stringent automotive engine exhaust emission control, for instance, in North America, Europe, and Japan. Due to enhanced catalyst performance and increased catalyst control accuracy, engine exhaust emissions mainly depend on the amount of exhaust at startup. In a control process that is initiated while the engine is stopped and then continued to maintain the engine speed at an idling level, a method of allowing the engine speed to overshoot the idling level, then reducing the engine speed to the idling level, and maintaining such an idling engine speed is employed for the purpose of achieving proper engine startup. Exhaust emission control is exercised to restrict the exhaust amounts [g] of HC, CO, NOx, and the like. However, since the intake air amount for startup unduly increases due to the above-mentioned engine speed overshoot, the exhaust amounts of HC, CO, and NOx increase excessively. Under the above circumstances, there is a need for optimizing the intake air amount for startup.

An invention disclosed in JP-A-2002-213261 minimizes such a startup intake air amount by setting the engine startup intake amount of each cylinder to a minimum value that achieves ignition.

SUMMARY OF THE INVENTION

However, since the above invention uses the minimum intake amount for combustion, a minimum torque is generated to impair startability. As described in JP-A-2002-213261, startability deterioration by combustion can be compensated for by providing motor assist. However, if only the engine is used as a driving source, the above prevention unavoidably causes startability deterioration. Further, the above invention cannot cope with changes in system characteristics (intake/exhaust valve sealing changes, intake/exhaust valve clearance changes, fuel property changes, residual fuel generation, etc.) because it exercises sequence control (feedforward control). In other words, the above invention has a low degree of freedom in control and is not adequately robust against deterioration with age, inherent error, and the like. In view of the above circumstances, the present invention proposes a low-exhaust-emission (small air amount) control technology that exhibits enhanced robustness and excellent startability.

According to an aspect of the present invention, as described in the following explanation in detail, there is provided an engine control device for starting an engine, the engine control device including: a section for setting a target engine operating state of each combustion; a section for detecting an actual engine operating state of each combustion, which results when the engine is controlled to obtain the target engine operating state; and a section for computing a control parameter for at least one subsequent combustion in accordance with the target engine operating state and the actual engine operating state. The engine control device exercises feedback control on an individual combustion basis so that the engine operating state of each combustion agrees with the target engine operating state (combustion state) during an engine startup process that is initiated in an engine stop state. Details will be given below by describing a second and subsequent aspects of the present invention. Since, for instance, the engine speed and air amount for startup can be accurately controlled by controlling the engine operating state (combustion state) of each combustion, the engine control device provides a startup profile that simultaneously assures satisfactory startability and low exhaust emissions (small air amount).

According to the present invention, as shown in FIG. 2, preferably, there is provided the engine control device as described in the aspect and illustrated in FIG. 2, wherein a combination of the target engine operating state and the actual engine operating state is at least one of a combination of a target increased engine speed and an actual increased engine speed, a combination of a target torque and an actual torque, a combination of a target in-cylinder pressure and an actual in-cylinder pressure, and a combination of a target air amount and an actual air amount.

According to the present invention, as shown in FIG. 3, preferably, there is provided the engine control device as described in the aspect and illustrated in FIG. 3, wherein the control parameter to be computed is at least one of an intake air amount, a fuel injection amount, ignition timing, intake/exhaust valve open/close timing, and an intake/exhaust valve lift amount. More specifically, the engine control device controls the intake air amount, fuel injection amount, ignition timing, intake/exhaust valve open/close timing, or intake/exhaust valve lift amount to ensure that the engine operating state of each combustion agrees with the target engine operating state.

According to the present invention, as shown in FIG. 4, preferably, there is provided the engine control device as described in the aspect and illustrated in FIG. 4, wherein the section for computing the control parameter computes the control parameter from engine control parameter 1, which is derived from the target engine operating state, and engine control parameter 2, which is derived from the target engine operating state and the actual engine operating state. More specifically, the engine control device computes a final engine control parameter in accordance with two control parameters. One of the two control parameters is computed by a feedforward control system that computes an engine control parameter from the target engine operating state of each combustion. The other control parameter is computed by a feedback control system that computes an engine control parameter from the target engine operating state of each combustion and the actual engine operating state of each combustion.

According to the present invention, as shown in FIG. 5, preferably, there is provided the engine control device as described in the aspect and illustrated in FIG. 5, wherein the control parameter is computed in accordance with the difference between the target engine operating state of each combustion and the actual engine operating state of each combustion. More specifically, the feedback control system, which controls an engine control parameter, computes the control parameter in accordance with the difference between the target engine operating state of each combustion and the actual engine operating state of each combustion.

According to the present invention, as shown in FIG. 6, preferably, there is provided the engine control device as described in the aspect and illustrated in FIG. 6, further including a section for predefining a target engine operating state of each combustion for switching to a predetermined engine operating state from an engine stop state within a predetermined period of time. More specifically, the engine control device predefines the target engine operating state of each combustion, beginning with the first combustion, during an engine startup process that is initiated in an engine stop state. A desired startup profile can be implemented when the achieved actual engine operating state of each combustion agrees with the target engine operating state of each combustion.

According to the present invention, as shown in FIG. 7, preferably, there is provided the engine control device as illustrated in FIG. 7, further including a section for predefining a target increased engine speed of each combustion for attaining a predetermined engine speed from an engine stop state within a predetermined period of time. In other words, the engine control device defines the engine operating state described in the sixth aspect as an increased engine speed of each combustion.

According to the present invention, as shown in FIG. 8, preferably, there is provided the engine control device as illustrated in FIG. 8, further including a section for changing a predetermined target increased engine speed of each subsequent combustion in accordance with the actual increased engine speed of each combustion. The target engine operating state of each combustion is predefined for the purpose of implementing a desired startup profile as described in the sixth aspect. In reality, however, the actual engine operating state of each combustion does not always agree with the target engine operating state. Therefore, the engine control device changes the target increased engine speed of each subsequent combustion in accordance with the actual increased engine speed of each combustion with a view toward implementing a desired startup profile.

According to the present invention, as shown in FIG. 9, preferably, there is provided the engine control device as illustrated in FIG. 9, wherein the section for changing the predetermined target increased engine speed of each subsequent combustion changes the target increased engine speed of each subsequent combustion so that a predetermined engine speed is attained within a predetermined period of time. More specifically, the target increased engine speed of each subsequent combustion, which is changed in accordance with the actual engine operating state as described in the eighth aspect, is changed so that a predetermined engine speed is attained within a predetermined period of time.

According to the present invention, as shown in FIG. 10, preferably, there is provided the engine control device as illustrated in FIG. 10, further including a section for changing the target increased engine speed of a subsequent combustion to a value higher than the predefined target increased engine speed when the actual increased engine speed is lower than the target increased engine speed.

According to the present invention, as shown in FIG. 11, preferably, there is provided the engine control device further including a section for changing the target increased engine speed of a subsequent combustion to a value lower than the predefined target increased engine speed when the actual increased engine speed is higher than the target increased engine speed.

More specifically, the target increased engine speed of each subsequent combustion, which is changed in accordance with the actual engine operating state as described in the seventh aspect, is changed so that the target increased engine speed of a subsequent combustion is changed to a value higher than the predefined target increased engine speed when the actual increased engine speed is lower than the target increased engine speed, or that the target increased engine speed of a subsequent combustion is changed to value lower than the predefined target increased engine speed when the actual increased engine speed is higher than the target increased engine speed. When control is exercised as described above, the target increased engine speed of each subsequent combustion is properly corrected even in a situation where the current increased engine speed differs from a desired increased engine speed (predefined increased engine speed). Eventually, this makes it possible to implement a desired startup profile (e.g., attain a predetermined engine speed within a predetermined period of time).

According to the present invention, as shown in FIG. 11, preferably, there is provided the engine control device as described in the aspect and illustrated in FIG. 11, further including: a section for setting the target increased engine speed of each subsequent combustion in accordance with the target increased engine speed of each combustion and the actual increased engine speed of each combustion; and a section for computing the target torque of each subsequent combustion or the target air amount of each subsequent combustion from the target increased engine speed of each subsequent combustion. More specifically, the target increased engine speed of each subsequent combustion is corrected in accordance with the difference between the predefined target increased engine speed and the actual increased engine speed. Further, the target torque of each subsequent combustion or the target air amount per cylinder of each subsequent combustion is computed to attain the target increased engine speed.

According to the present invention, as shown in FIG. 12, preferably, there is provided the engine control device as illustrated in FIG. 12, wherein a target air amount, a target fuel injection amount, target ignition timing, target intake/exhaust valve open/close timing, or a target intake/exhaust valve lift amount is computed in accordance with the target torque of each subsequent combustion. More specifically, the target air amount, target fuel injection amount, target ignition timing, target intake/exhaust valve open/close timing, or target intake/exhaust valve lift amount of each subsequent combustion is computed to generate the target torque of each subsequent combustion, which is computed as described in the twelfth aspect. The target air amount, target fuel injection amount, target ignition timing, target intake/exhaust valve open/close timing, or target intake/exhaust valve lift amount is a manipulative variable for the engine control device.

According to the present invention, as shown in FIG. 13, preferably, there is provided the engine control device as illustrated in FIG. 13, further including a section for computing a target torque of each subsequent combustion in accordance with the target increased engine speed of each subsequent combustion and at least engine rotational inertia force and/or friction force. The rotational inertia force and friction force contribute to the rotary motion of the engine. Therefore, when the torque providing the target increased engine speed to be successively corrected is to be calculated as described in the twelfth aspect, the rotational inertia force and friction force are taken into account.

According to the present invention, there is provided the engine control device as described in the aspect, further including: a section for computing in-cylinder pressure or indicated mean effective pressure of a combustion from an intake air amount per cylinder of the combustion and a target fuel amount or a target air-fuel ratio per cylinder of the combustion; and a section for computing friction torque from the in-cylinder pressure or the indicated mean effective pressure and an actual increased engine speed of the combustion. More specifically, the in-cylinder pressure or indicated mean effective pressure of the combustion can be estimatingly computed from the intake air amount, target fuel amount, and target air-fuel ratio. Meanwhile, the actual increased engine speed is determined by the indicated mean effective pressure and friction torque. Therefore, the friction torque prevailing under particular operating conditions (engine speed, water temperature, ambient temperature, etc.) can be estimatingly computed from the estimated indicated mean effective pressure and actual increased engine speed.

According to the present invention, there is provided the engine control device as described in the aspect, further including: a section for estimating a fuel evaporation rate or a fuel property of a combustion from an intake air amount per cylinder of the combustion, a target fuel amount or a target air-fuel ratio per cylinder of the combustion, and actual in-cylinder pressure or actual indicated mean effective pressure of the combustion; and a section for computing friction torque from the actual in-cylinder pressure or the actual indicated mean effective pressure and an actual increased engine speed of the combustion. More specifically, the in-cylinder pressure or indicated mean effective pressure of the combustion can be estimatingly computed from the intake air amount, target fuel amount, and target air-fuel ratio as is the case with the fifteenth aspect. The difference between the estimated indicated mean effective pressure and actual indicated mean effective pressure is dependent on the fuel evaporation rate and used to estimate the fuel evaporation rate or fuel property. Further, the friction torque (internal loss torque) is estimatingly computed from the actual indicated mean effective pressure and actual increased engine speed.

According to the present invention, there is provided the engine control device as described in the aspect, wherein control is exercised over the first combustion upon engine startup and a predetermined number of subsequent combustions. In other words, the engine control device described in the aspect exercises control over only an early stage of startup. For example, the engine control device exercises control until the engine speed reaches a target idle speed. Subsequently, the engine control device may exercise conventional control.

According to the present invention, there is provided the engine control device as described in the aspect, wherein the actual engine speed reaches a predetermined engine speed within a predetermined period of time after engine stoppage no matter whether fuel property, combustion efficiency, friction, atmospheric pressure, ambient temperature, or other environmental condition is changed. More specifically, the eighteenth aspect of the present invention controls the engine operating state so as to obtain a desired startup profile no matter whether a disturbance occurs due to a change in the fuel property, combustion efficiency, friction, atmospheric pressure, ambient temperature, or other environmental condition.

To attain a predetermined operating state (e.g., a predetermined engine speed) from an engine stop state within a predetermined period of time, the present invention proposes a method of exercising feedback control to ensure that the operating state of each combustion agrees with a target operating state (combustion state) as described above. Therefore, low-exhaust-emission startup can be accomplished while assuring enhanced robustness and excellent startability.

DETAILED DESCRIPTION OF THE PREFERRED EMBODIMENTS

First Embodiment

Figure 1:
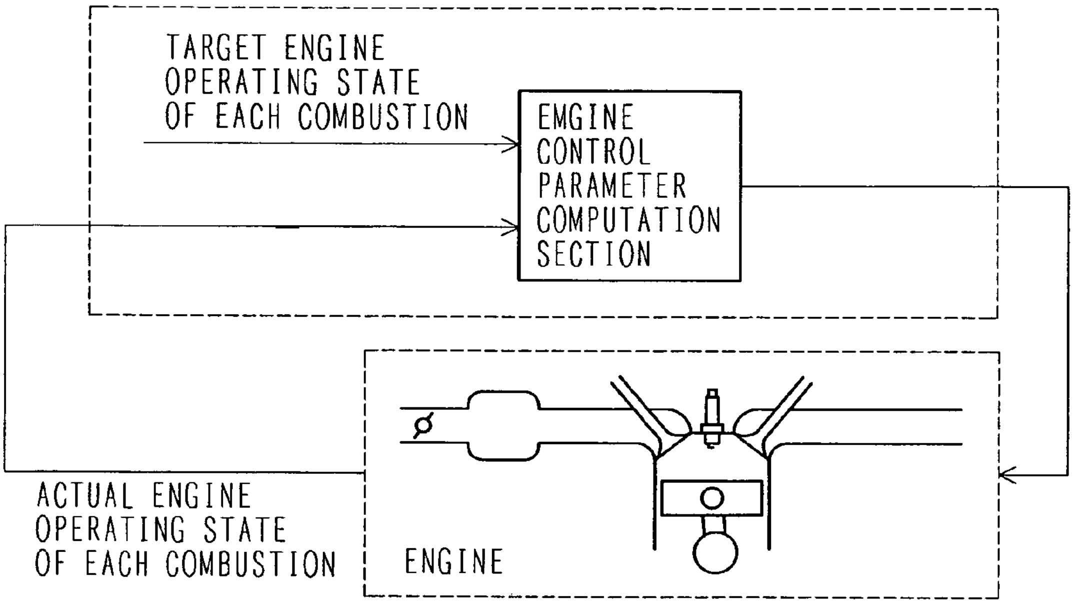
FIG. 1 shows an engine control device according to the present invention.
Figure 2:
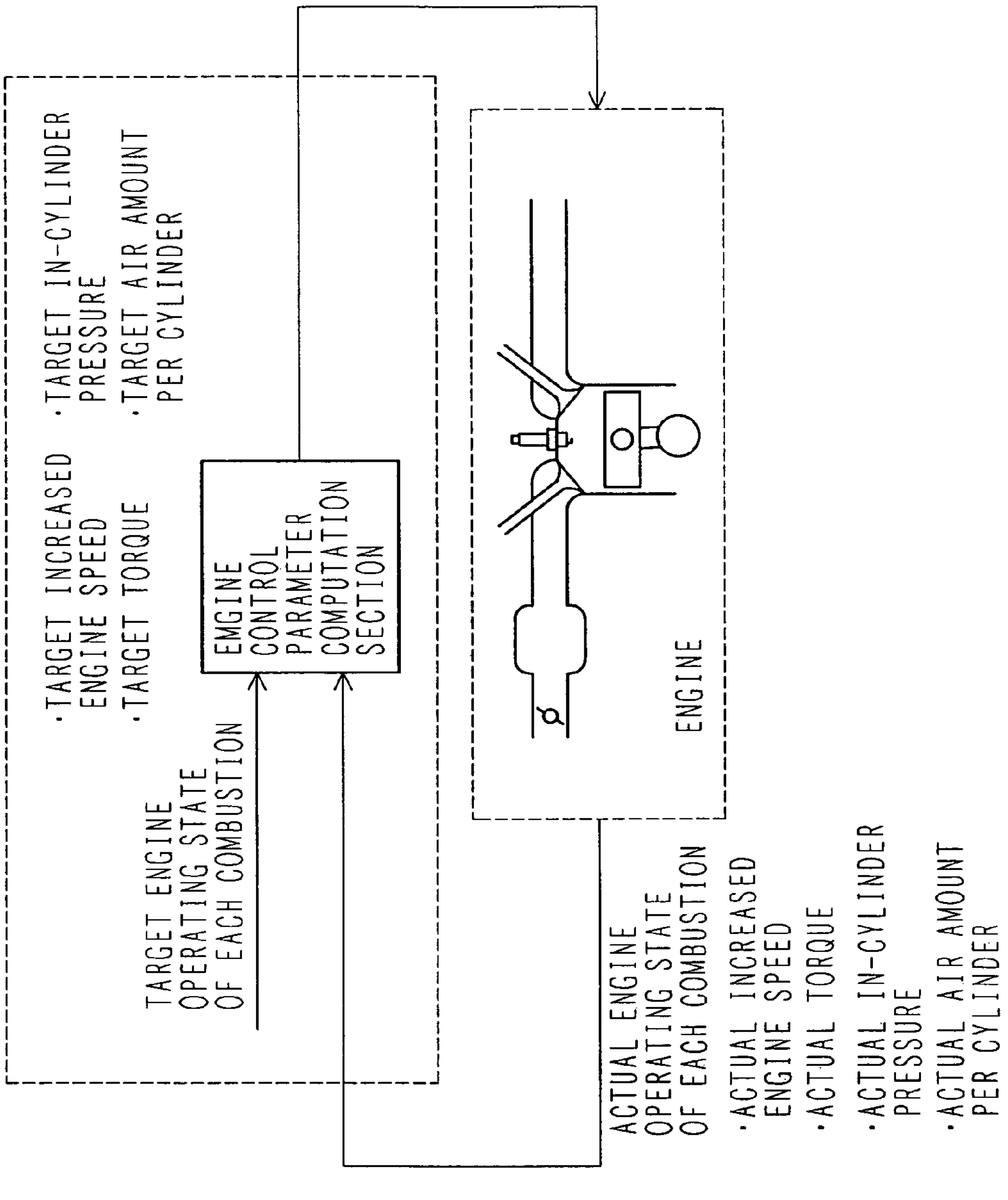
FIG. 2 shows an engine control device according to the present invention.
Figure 3:
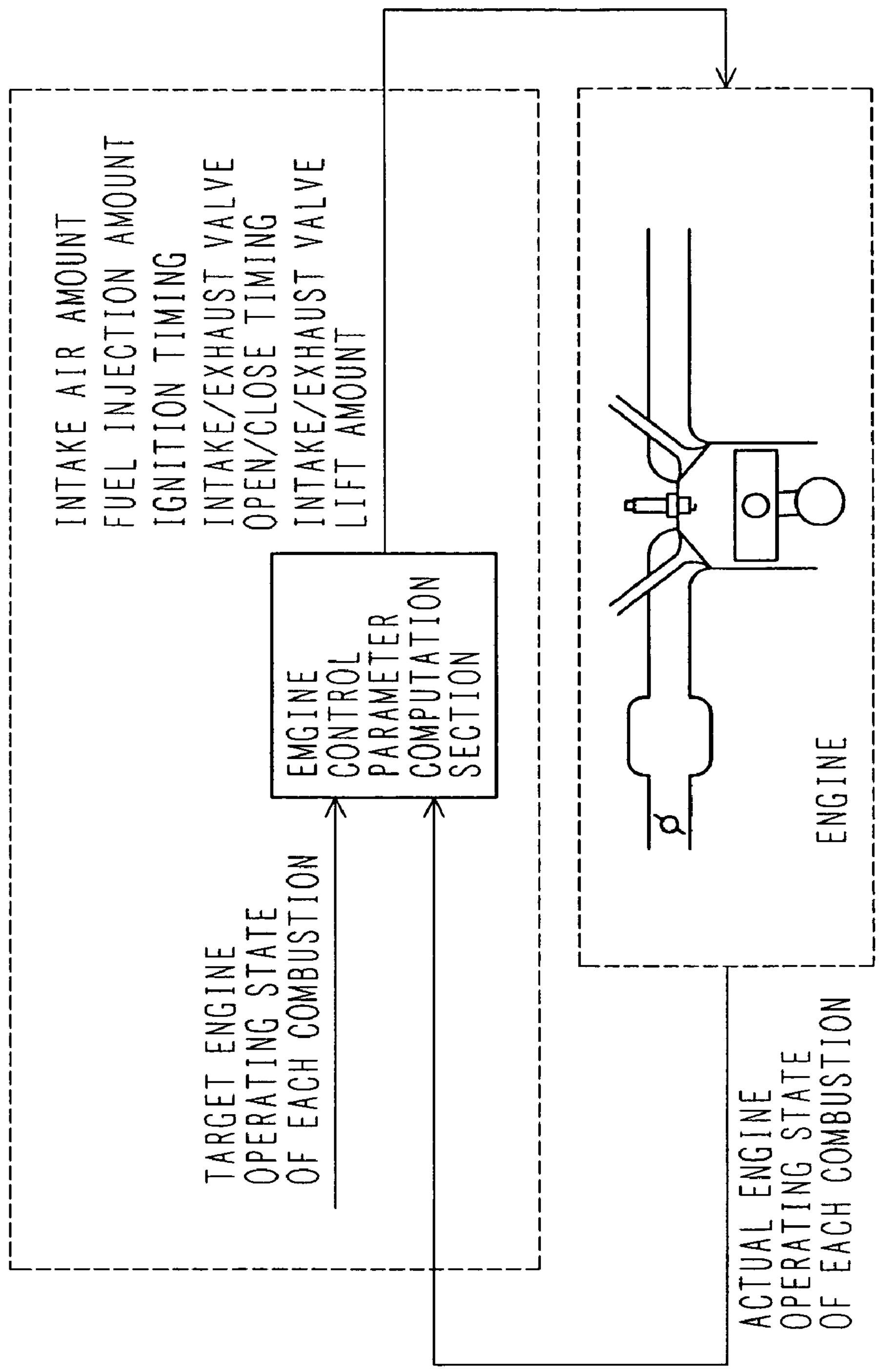
FIG. 3 shows an engine control device according to the present invention.
Figure 4:
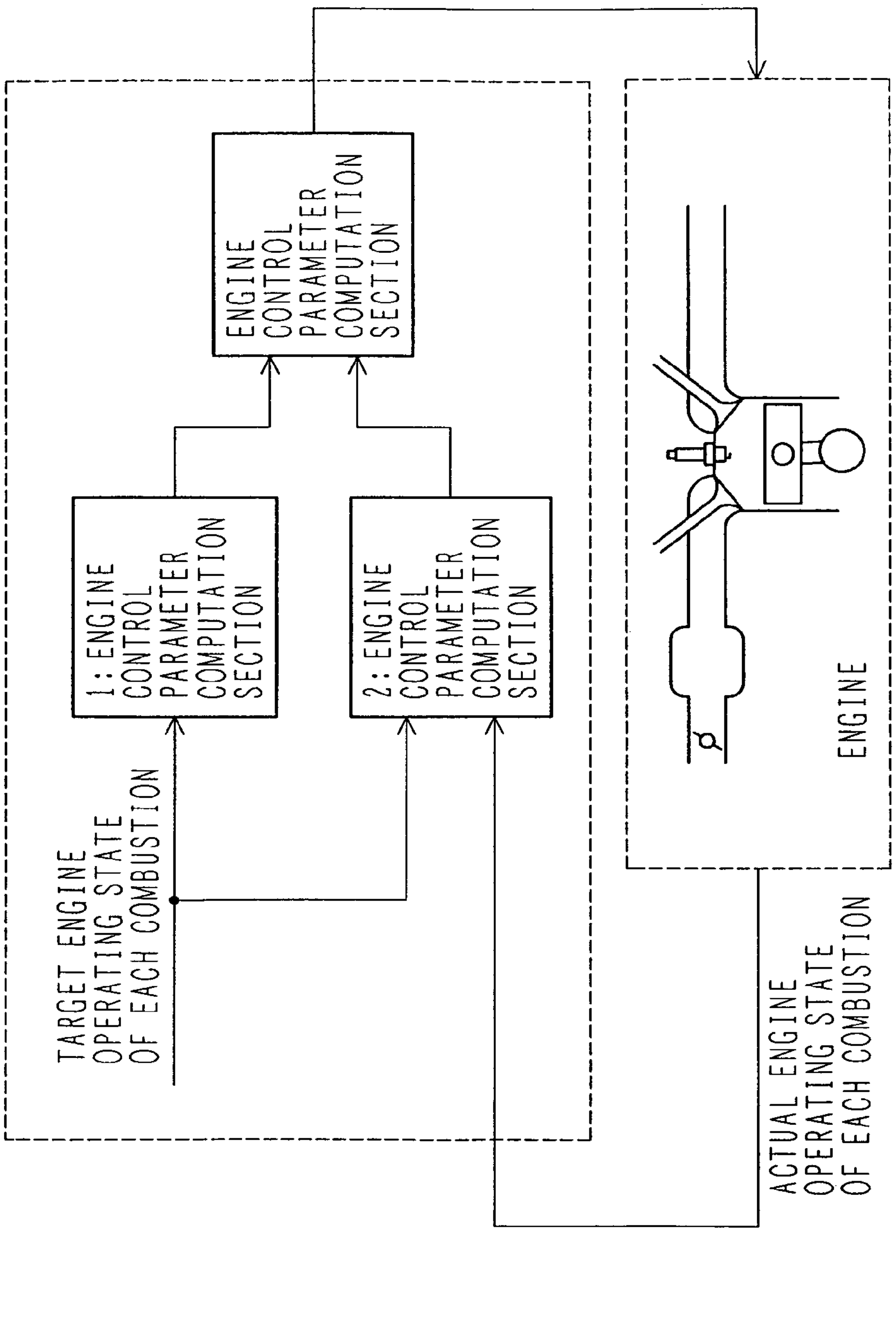
FIG. 4 shows an engine control device according to the present invention.
Figure 5:
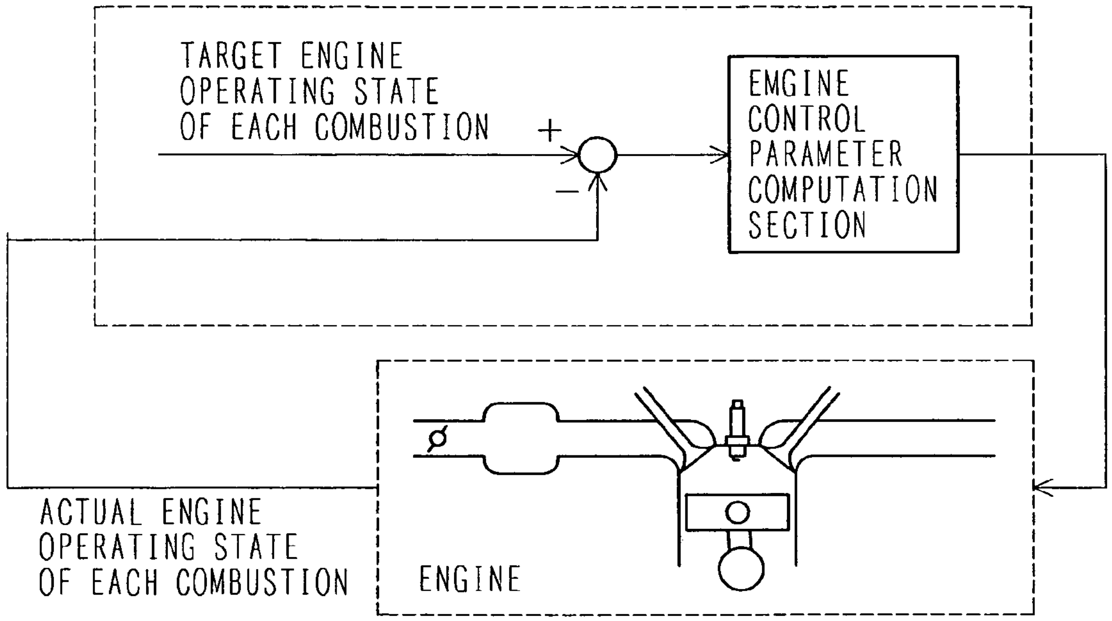
FIG. 5 shows an engine control device according to the present invention.
Figure 6:
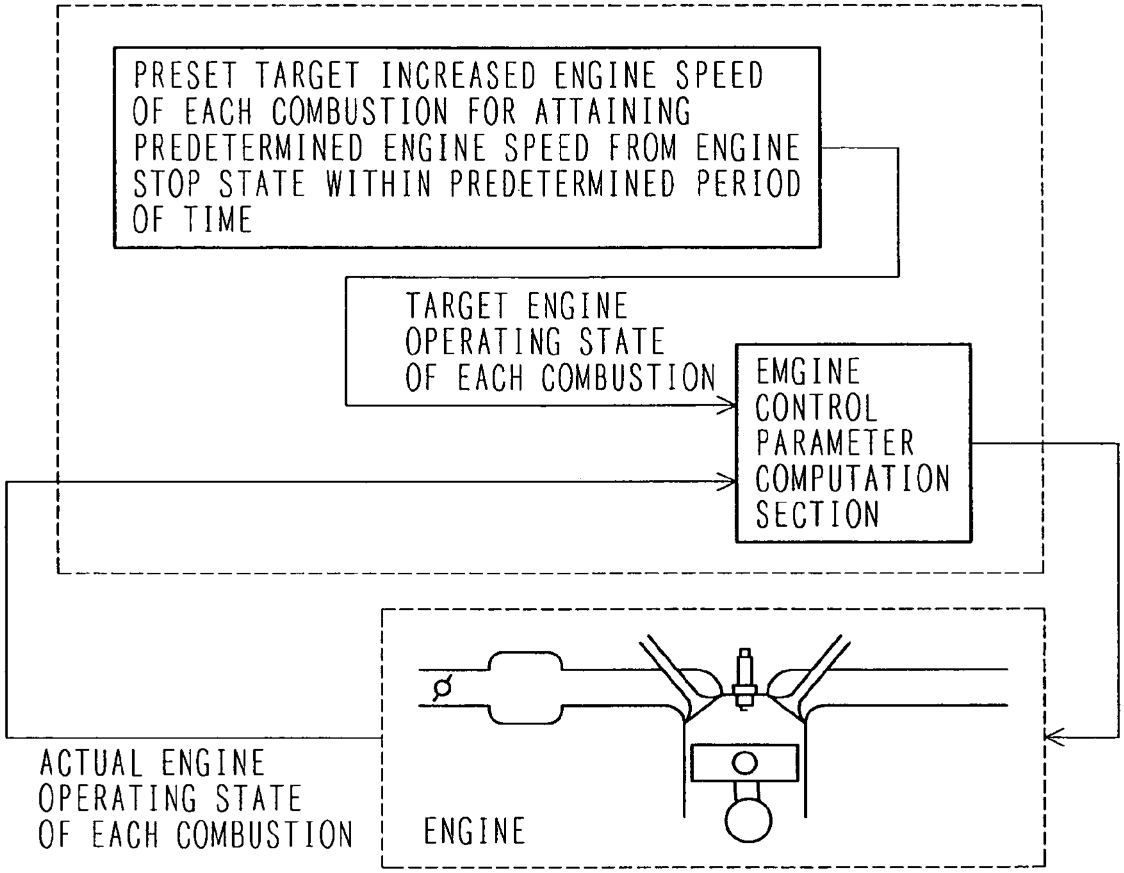
FIG. 6 shows an engine control device according to the present invention.
Figure 7:
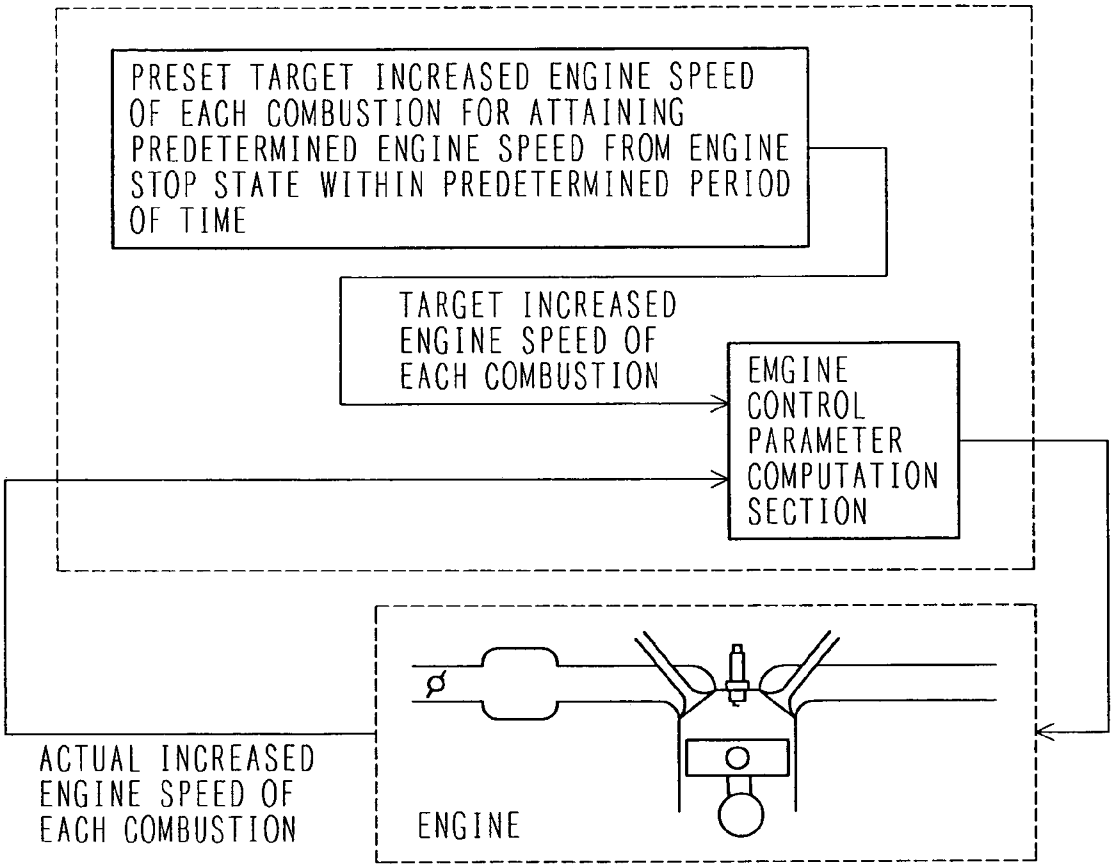
FIG. 7 shows an engine control device according to the present invention.
Figure 8:
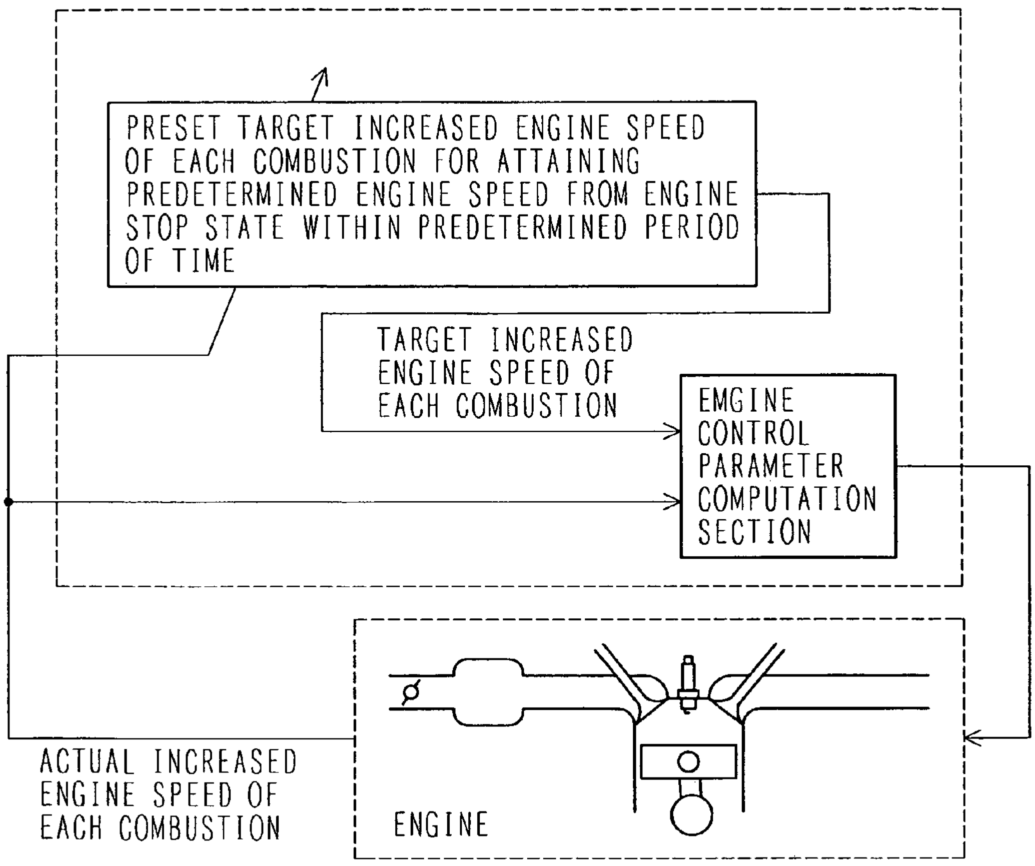
FIG. 8 shows an engine control device according to the present invention.
Figure 9:
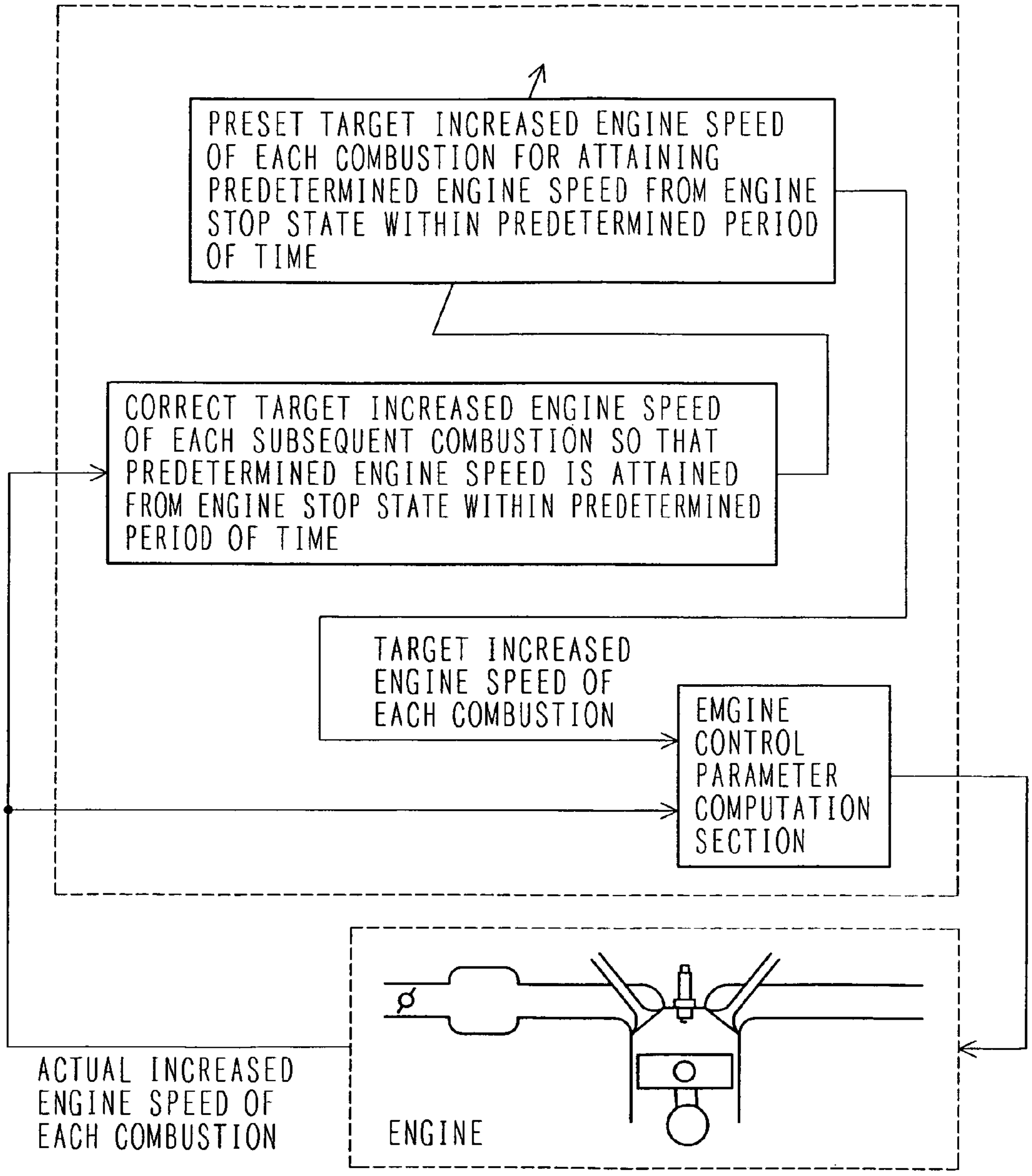
FIG. 9 shows an engine control device according to the present invention.
Figure 10:
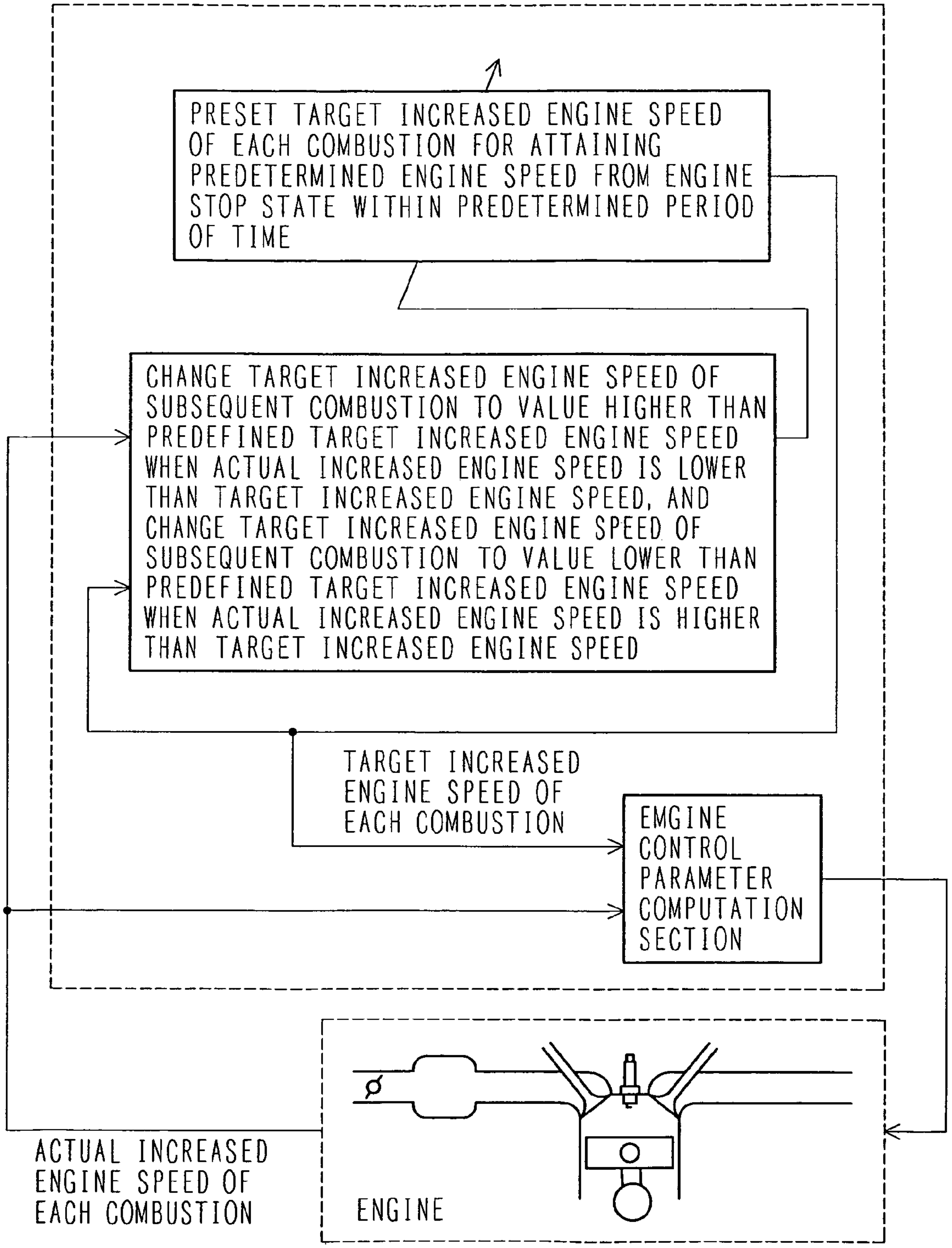
FIG. 10 shows an engine control device according to the present invention.
Figure 11:
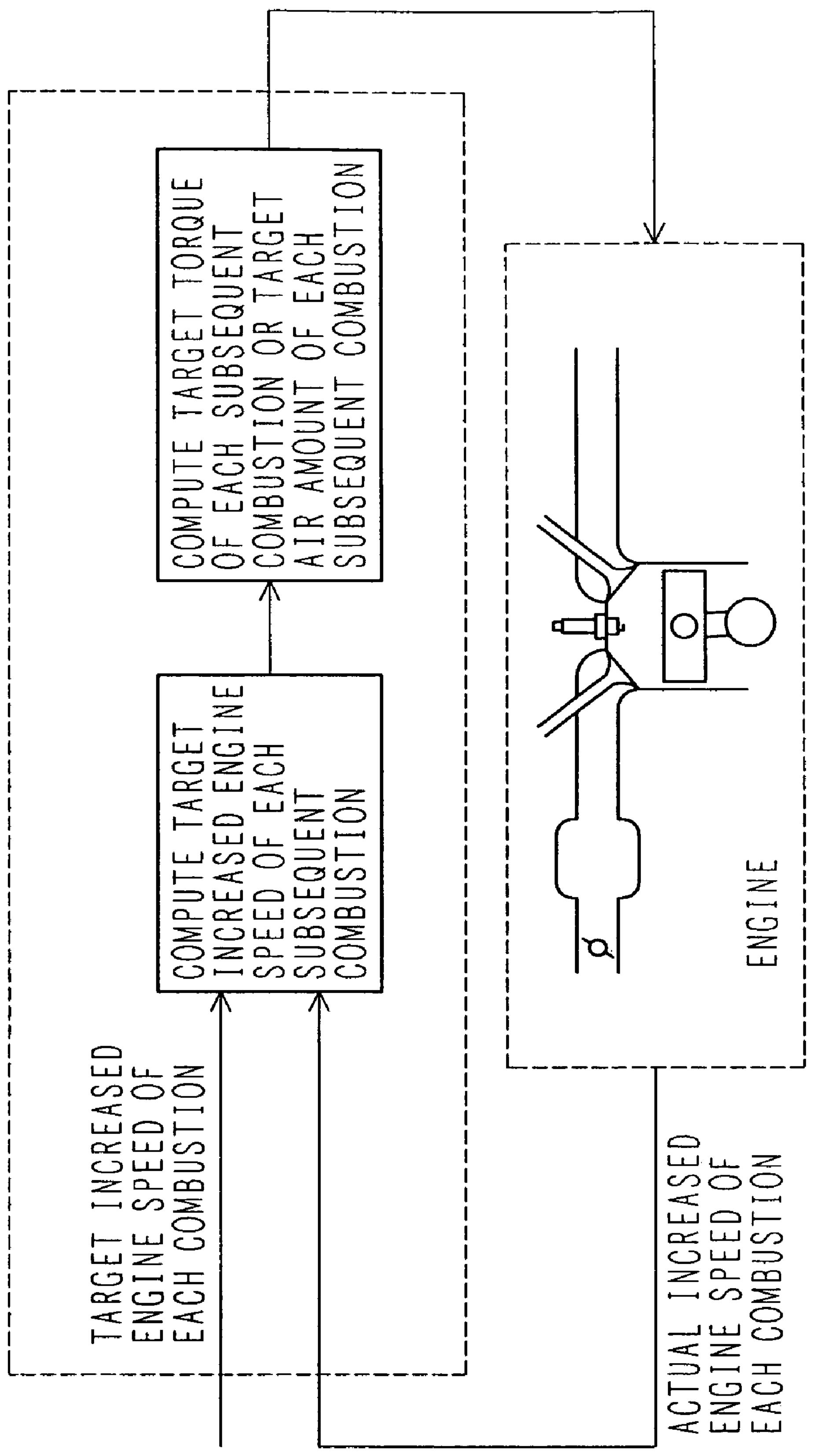
FIG. 11 shows an engine control device according to the present invention.
Figure 12:
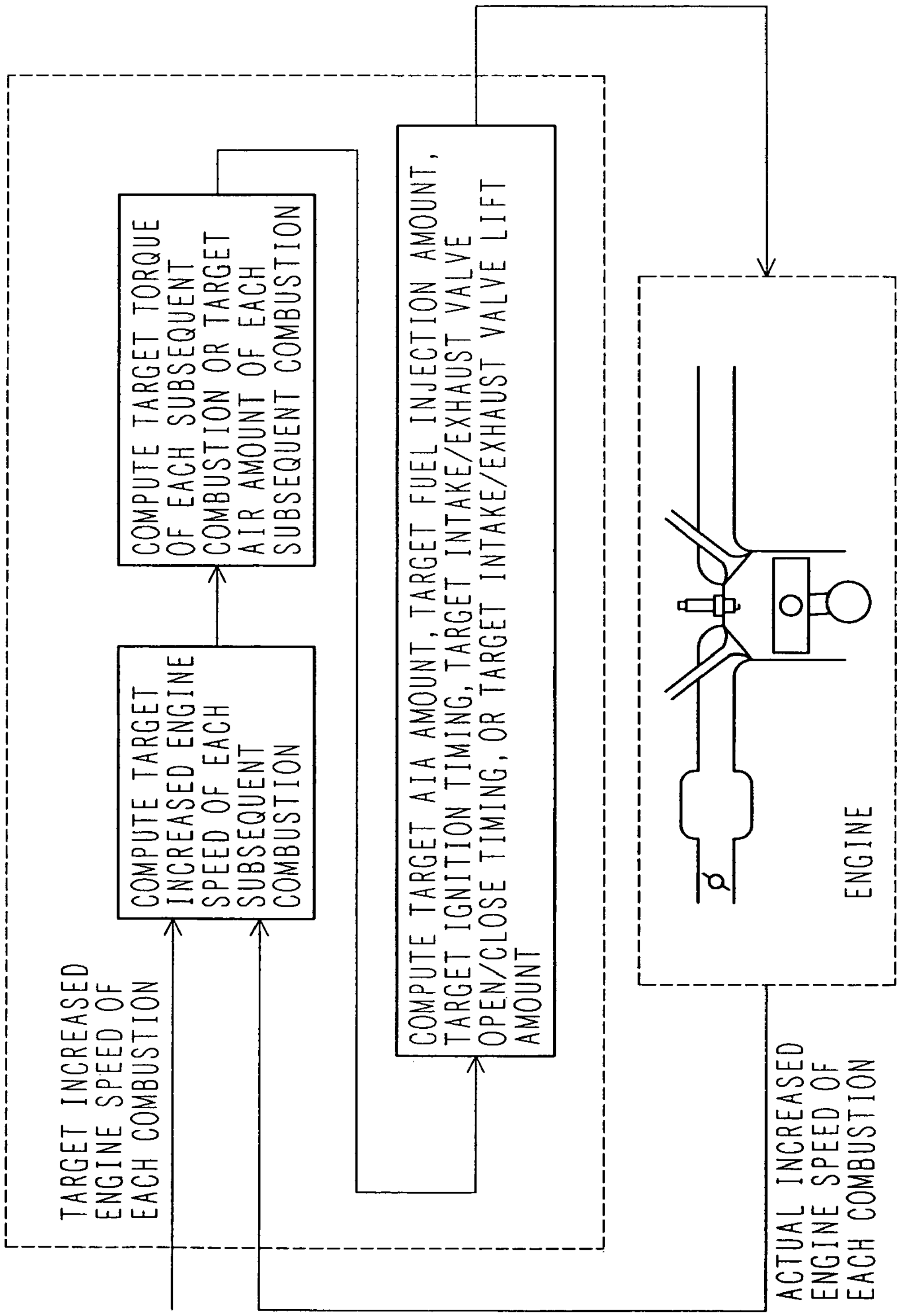
FIG. 12 shows an engine control device according to the present invention.
Figure 13:
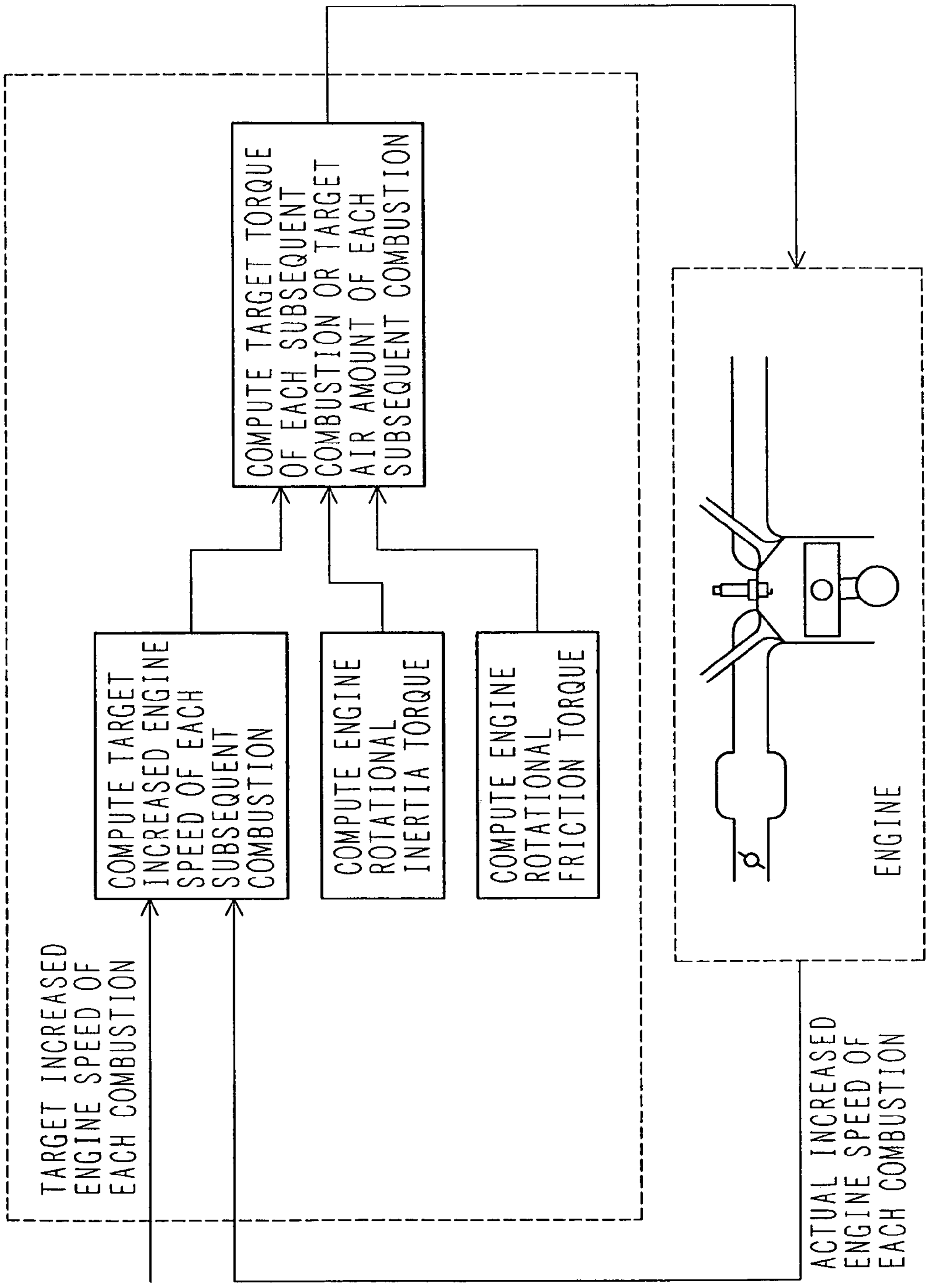
FIG. 13 shows an engine control device according to the present invention.
Figure 14:
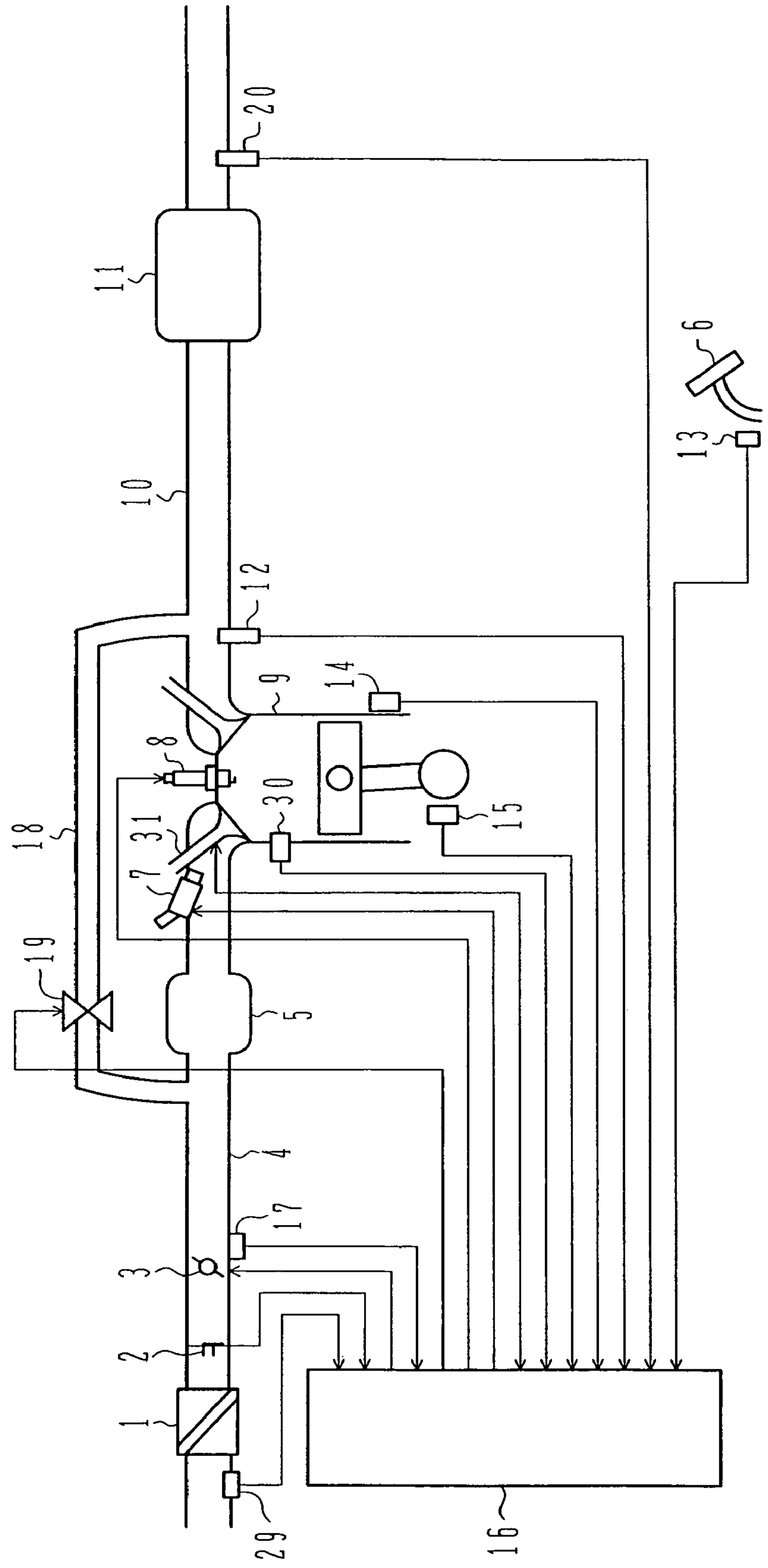
FIG. 14 shows an engine control system according to first to fifth embodiments of the present invention.

FIG. 14 shows a system according to a first embodiment of the present invention. In a multiple-cylinder engine 9, outside air passes through an air cleaner 1, travels through an intake manifold 4 and a collector 5, and flows into a cylinder. An intake air amount is adjusted by an electronic throttle 3. An air flow sensor 2 detects the intake air amount. A crank angle sensor 15 outputs a signal at crankshaft rotation angles of 1° and 120°. A water temperature sensor 14 detects the cooling water temperature of the engine. An accelerator opening sensor 13 detects torque demanded by a driver by detecting the depression amount of an accelerator 6. Signals generated from the accelerator opening sensor 13, the air flow sensor 2, a throttle opening sensor 17 mounted on the electronic throttle 3, the crank angle sensor 15, and the water temperature sensor 14 are delivered to a control unit 16. The operating state of the engine is determined from the above sensor outputs to optimally compute main manipulative variables of the engine such as an air amount, fuel injection amount, and ignition timing. The fuel injection amount computed in the control unit 16 is converted to a valve opening pulse signal and forwarded to a fuel injection valve 7. Further, a drive signal is sent to an ignition plug 8 so that ignition occurs with the ignition timing computed in the control unit 16. Injected fuel mixes with air supplied from the intake manifold, and flows into a cylinder of the engine 9 to form an air-fuel mixture. An intake valve 31 is a variable valve so that its opening timing and closing timing can be respectively controlled. The ignition plug 8 generates a spark with predetermined ignition timing. The generated spark then explodes the air-fuel mixture. The resulting combustion pressure pushes a piston downward to generate an engine driving force. Exhaust generated after explosion is conveyed to a three-way catalyst 11 through an exhaust manifold 10. Part of the exhaust flows back to the intake side through an exhaust backflow pipe 18. A backflow amount is controlled by a valve 19. An A/F sensor 12 is installed between the engine 9 and three-way catalyst 11. It has an output characteristic that is linear to the oxygen concentration in the exhaust. The relationship between the air-fuel ratio and the oxygen concentration in the exhaust is substantially linear. Therefore, the A/F sensor 12, which detects the oxygen concentration, can determine the air-fuel ratio. The control unit 16 calculates the air-fuel ratio prevailing upstream of the three-way catalyst 11 from a signal of the A/F sensor 12, and uses a signal of an $O_2$ sensor 20 to calculate the oxygen concentration prevailing downstream of the three-way catalyst or determine whether the current air-fuel ratio is richer or leaner than a stoichiometric air-fuel ratio. Further, the control unit 16 uses the outputs of the above two sensors to exercise F/B control in such a manner as to successively correct the fuel injection amount or air amount to optimize the purification efficiency of the three-way catalyst 11. An intake temperature sensor 29 detects intake temperature, and an in-cylinder pressure sensor 30 detects in-cylinder pressure.

Figure 15:
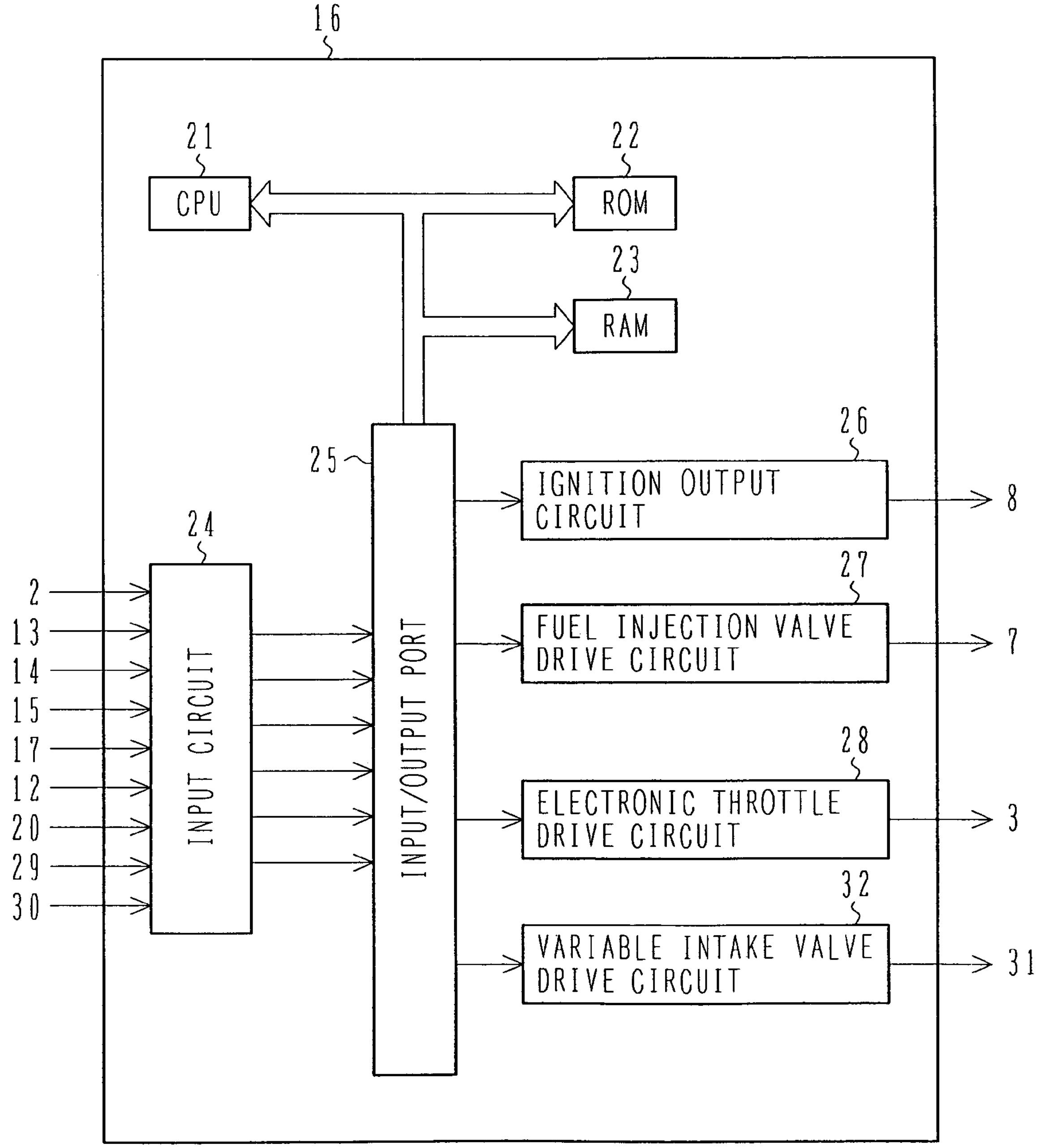
FIG. 15 shows the inside of a control unit according to the first to fifth embodiments of the present invention.

FIG. 15 shows the inside of the control unit 16. Output values generated from the A/F sensor 12, throttle valve opening sensor 17, air flow sensor 2, engine speed sensor 15, water temperature sensor 14, accelerator opening sensor 13, $O_2$ sensor 20, intake temperature sensor 29, and in-cylinder pressure sensor 30 enter the control unit (ECU) 16. The entered sensor output values are then subjected to noise removal and other signal processes in input circuits 24 and forwarded to an input/output port 25. An input port value is stored in a RAM 23 and subjected to arithmetic processing in a CPU 21. A control program in which an arithmetic process is described is already written in a ROM 22. Values representing various actuator operation amounts, which are computed in accordance with the control program, are first stored in the RAM 23 and then forwarded to the output port 25. An ON/OFF signal is set as an ignition plug operation signal. This signal turns ON when a primary coil in an ignition output circuit is conducting and turns OFF when it is not conducting. Ignition occurs when the signal status changes from ON to OFF. The ignition plug signal, which is set at the output port, is amplified in the ignition output circuit 26 to an adequate energy level for combustion and then supplied to the ignition plug. An ON/OFF signal is set as a fuel injection valve drive signal. This signal turns ON to open the fuel injection valve and turns OFF to close the fuel injection valve. This signal is amplified to an adequate energy level for opening the fuel injection valve and then forwarded to the fuel injection valve 7. A drive signal for obtaining a target opening of the electronic throttle 3 is sent to the electronic throttle 3 through an electronic throttle drive circuit 28. A drive signal for timing the opening and closing of the variable intake valve 31 is sent to the variable intake valve 31 through a drive circuit 32. The control program written in the ROM 22 will be described below.

Figure 16:
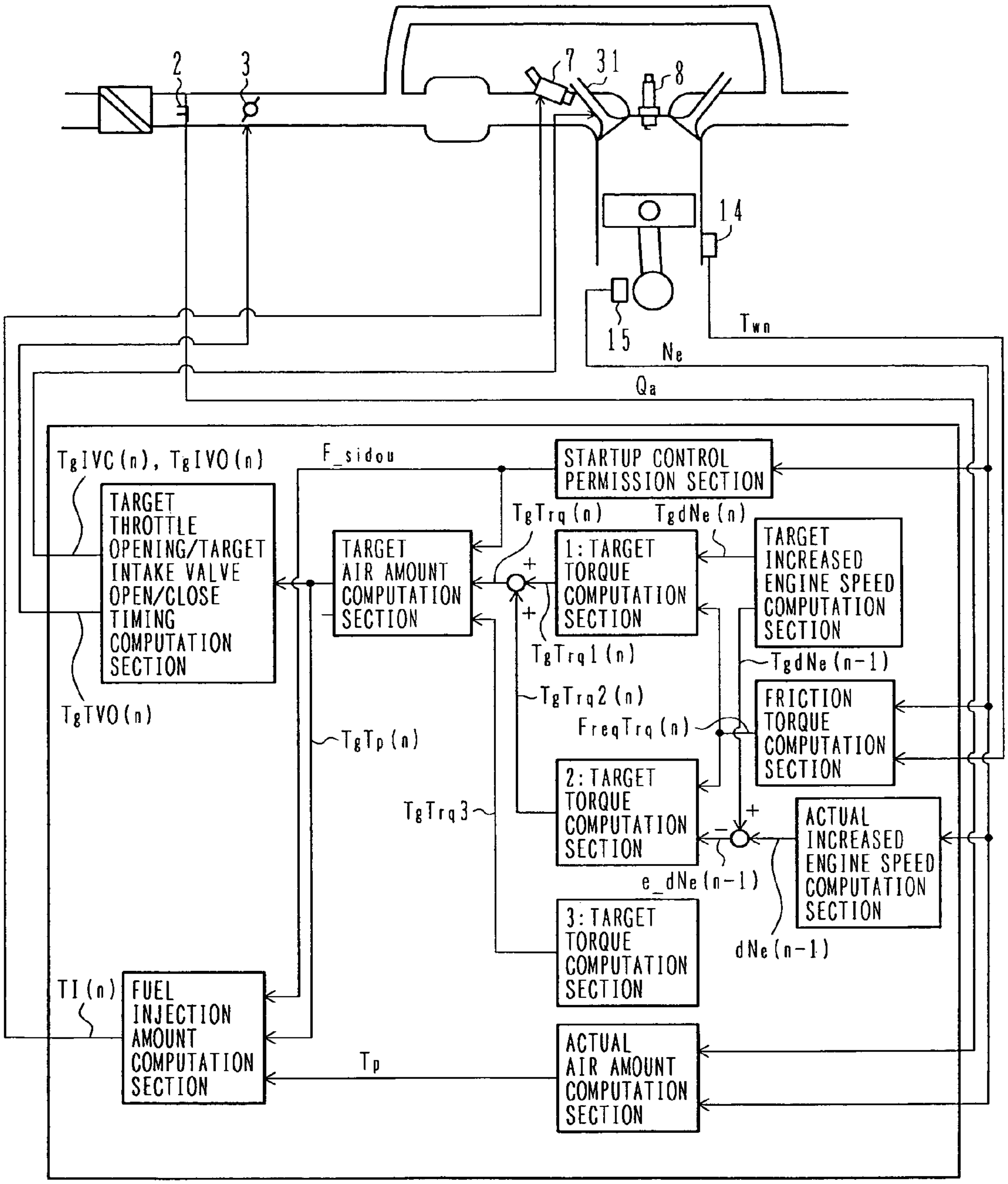
FIG. 16 is a block diagram illustrating an overall control system according to the first embodiment of the present invention.
Figure 17:
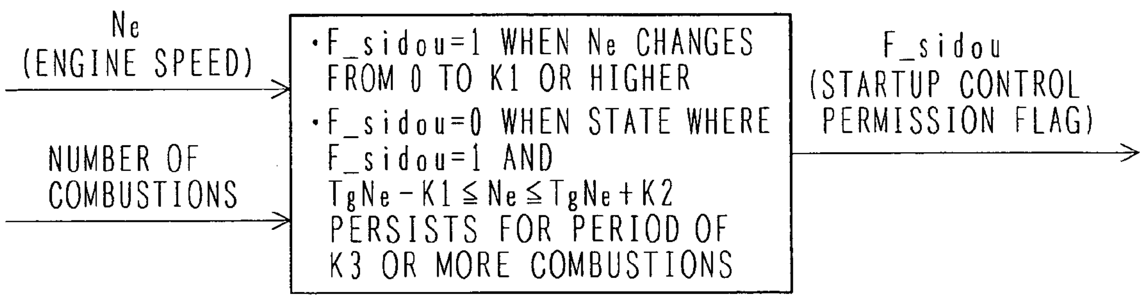
FIG. 17 is a block diagram illustrating a startup control permission section according to the first to fifth embodiments of the present invention.

FIG. 16 is a block diagram illustrating an overall control system. The control system includes the following computation sections:

Startup control permission section (FIG. 17)

Figure 18:
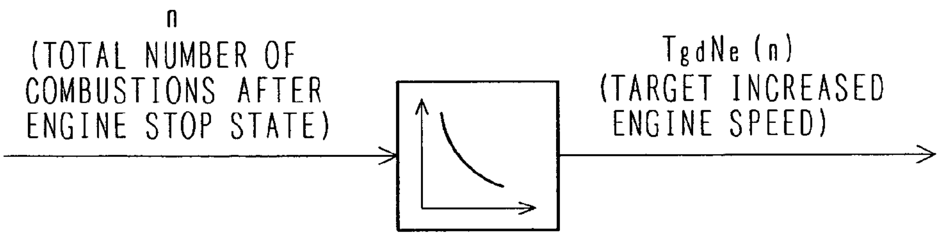
FIG. 18 is a block diagram illustrating a target increased engine speed computation section according to the first, second, and fifth embodiments of the present invention.

Target increased engine speed computation section (FIG. 18)

Figure 19:
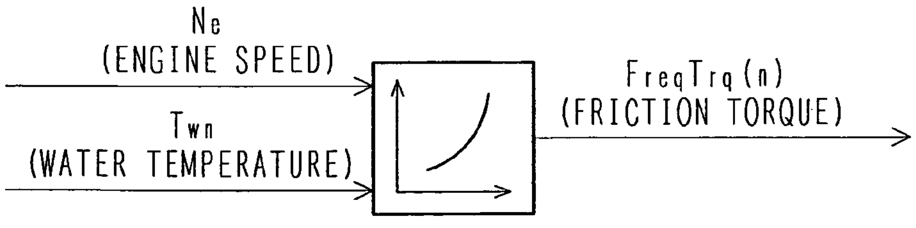
FIG. 19 is a block diagram illustrating a friction torque computation section according to the first, second, fourth, and fifth embodiments of the present invention.

Friction torque computation section (FIG. 19)

Figure 20:
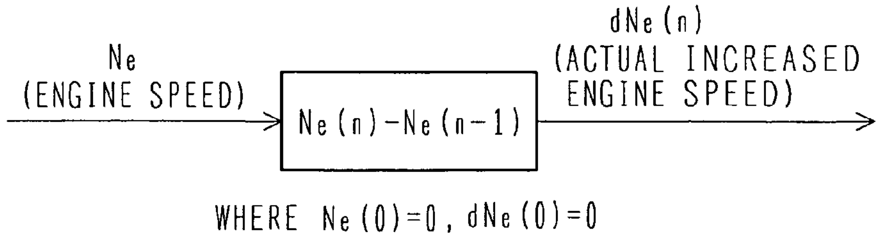
FIG. 20 is a block diagram illustrating an actual increased engine speed computation section according to the first, second, fourth, and fifth embodiments of the present invention.

Actual increased engine speed computation section (FIG. 20)

Figure 21:
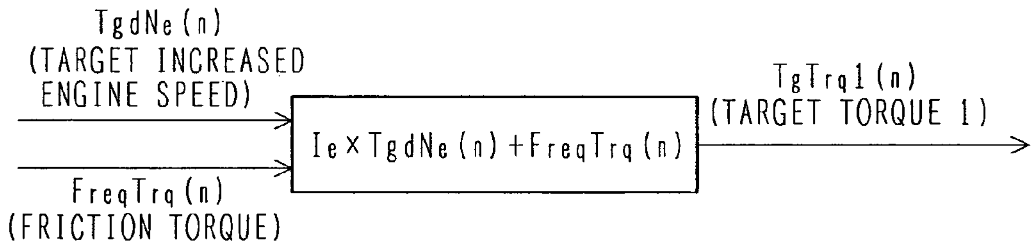
FIG. 21 is a block diagram illustrating target torque computation section 1 according to the first, second, fourth, and fifth embodiments of the present invention.

Target torque computation section 1 (FIG. 21)

Figure 22:
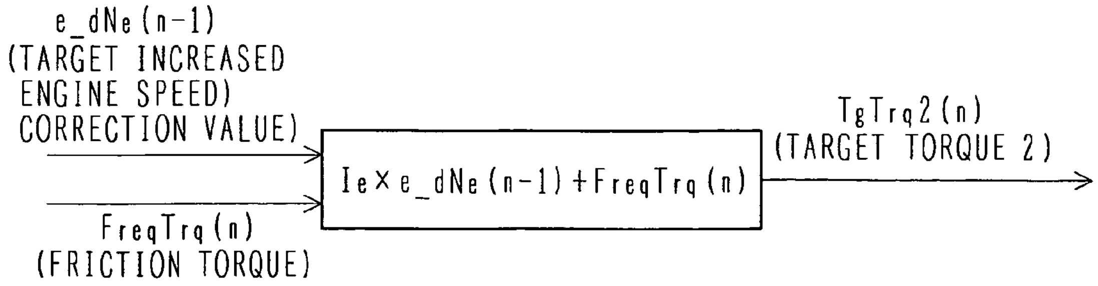
FIG. 22 is a block diagram illustrating target torque computation section 2 according to the first, second, and fifth embodiments of the present invention.

Target torque computation section 2 (FIG. 22)

Figure 23:
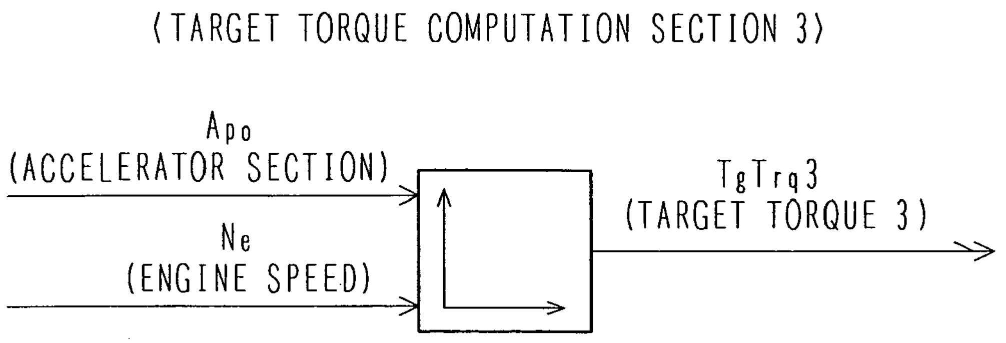
FIG. 23 is a block diagram illustrating target torque computation section 3 according to the first, second, fourth, and fifth embodiments of the present invention.

Target torque computation section 3 (FIG. 23)

Figure 24:
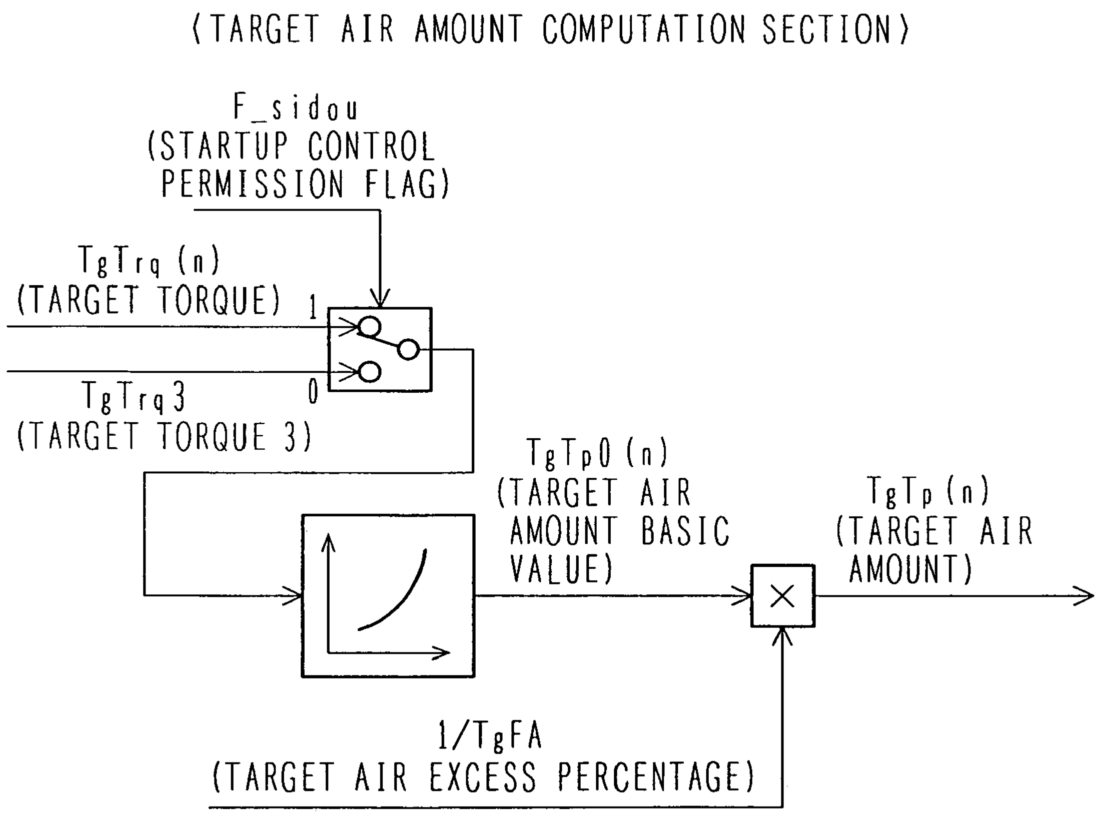
FIG. 24 is a block diagram illustrating a target air amount computation section according to the first embodiment of the present invention.

Target air amount computation section (FIG. 24)

Figure 25:
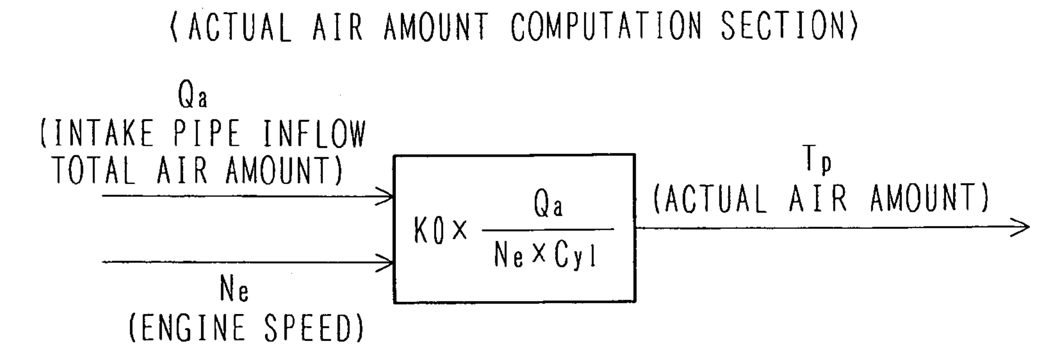
FIG. 25 is a block diagram illustrating an actual air amount computation section according to the first to fifth embodiments of the present invention.

Actual air amount computation section (FIG. 25)

Figure 26:
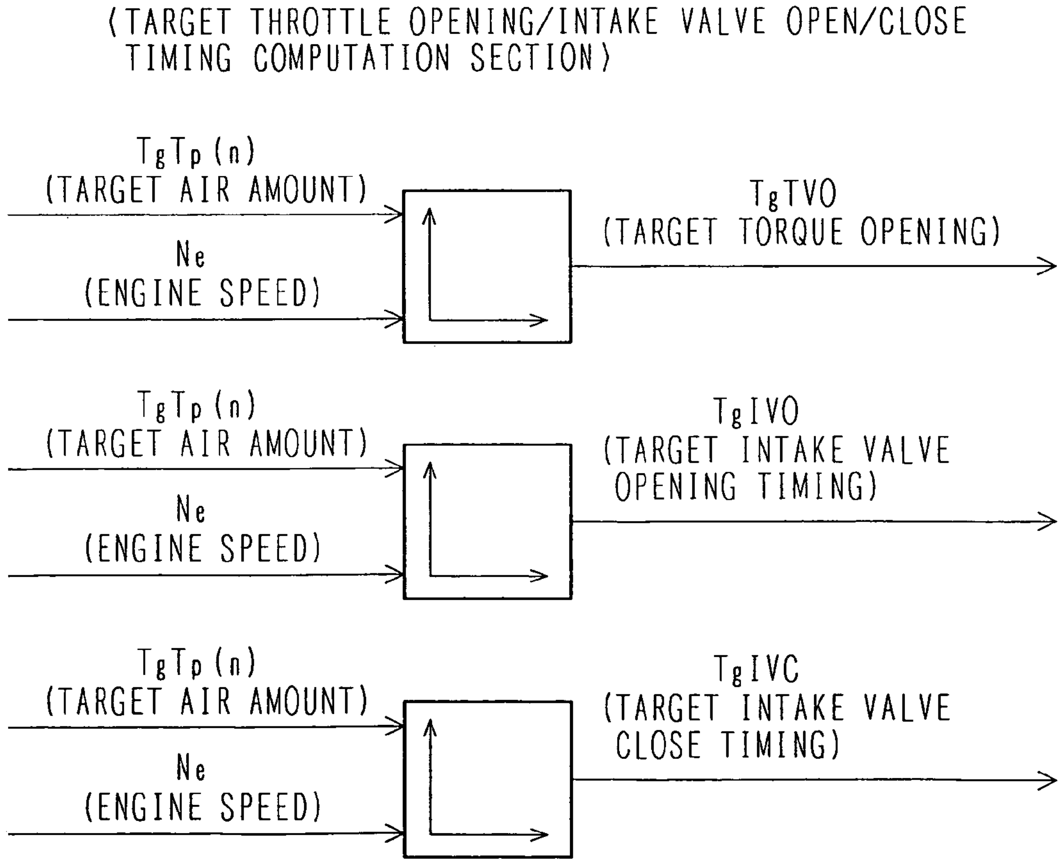
FIG. 26 is a block diagram illustrating a target throttle opening/intake valve open/close timing computation section according to the first to fifth embodiments of the present invention.

Target throttle opening/intake valve open/close timing computation section (FIG. 26)

Figure 27:
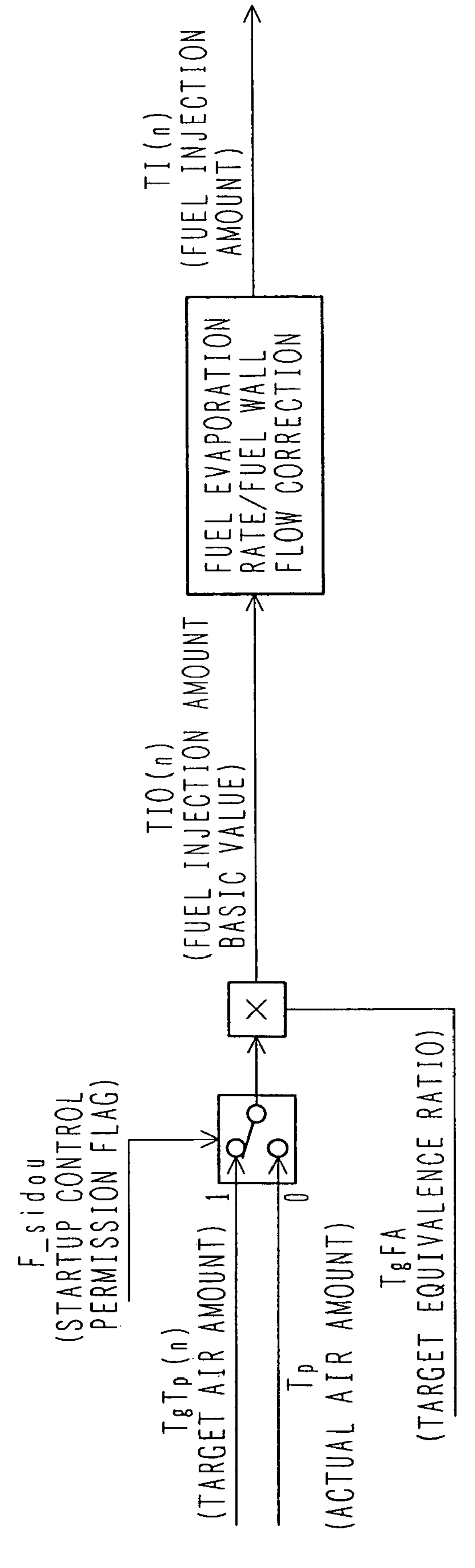
FIG. 27 is a block diagram illustrating a fuel injection amount computation section according to the first to fifth embodiments of the present invention.

Fuel injection amount computation section (FIG. 27)

When startup control is permitted by the startup control permission section (F_sidou=1), the target increased engine speed computation section computes a target increased engine speed (TgdNe(n)) of each combustion for startup. In accordance with the target increased engine speed and a friction torque (FreqTrq(n)) computed by the friction torque computation section, target torque computation section 1 computes target torque 1 (TgTrq1(*n*)). In accordance with the difference (e_dNe(n−1)) between the target increased engine speed (TgdNe(n−1)) and an actual increased engine speed (dNe(n−1)) computed by the actual increased engine speed computation section and the friction torque (FreqTrq(n)), target torque computation section 2 computes target torque 2. The sum of target torque 1 (TgTrq1(*n*)) and target torque 2 (TgTrq2(*n*)) is regarded as a target torque (TgTrq(n)) of each combustion for startup. Target torque computation 3 computes target torque 3 (TgTrq3(*n*)), which relates to a normal operation after startup, that is, a case where startup control is not permitted (F_sidou=0). The target air amount computation section computes a target air amount (TgTp(n)) of each combustion from the startup target torque (TgTrq(n)) or normal operation target torque (TgTrq3(*n*)). In accordance with the target air amount (TgTp(n)), the target throttle opening/intake valve open/close timing computation section computes a target throttle opening (TgIVO(n)) of each combustion and an intake valve open/close timing (TgIVO(n), TgIVC(n)) of each combustion. The actual air amount computation section computes an actual intake air amount (Tp) per cylinder in accordance, for instance, with an output signal generated from the air flow sensor 2. When startup control is permitted (F_sidou=1), the fuel injection amount computation section computes a fuel injection amount (TI(n)) of each combustion in accordance with the target air amount (TgTp(n)) of each combustion. When, on the other hand, startup control is not permitted (F_sidou=0), that is, when a normal operation is to be performed after startup, the fuel injection amount computation section computes the fuel injection amount (TI) in accordance with the actual intake air amount (Tp).

Each computation section will be described in detail below.

<Startup Control Permission Section (FIG. 17)>

This computation section (permission section) determines whether or not to permit startup control (F_sidou). More specifically, this section performs the following operations as shown in FIG. 17:

F_sidou=1 when Ne (engine speed) changes from 0 to K1 or higher.

F_sidou=0 when a state where F_sidou=1 and TgNe (post-startup idling target engine speed)−K1≦Ne≦TgNe+K2 persists for a period of K3 or more combustions.

The parameters K1, K2, and K3, which define an engine speed convergence state, should be empirically determined.

<Target Increased Engine Speed Computation Section (FIG.18)>

This computation section computes the target increased engine speed (TgdNe(n)) of each combustion for engine startup. More specifically, this section references a table and computes TgdNe(n) (target increased engine speed of each combustion) in accordance with n (total number of combustions after an engine stop state) as shown in FIG. 18. Table settings for determining TgdNe(n) should be predetermined so as to obtain a desired startup profile.

<Friction Torque Computation Section (FIG. 19)>

This computation section computes the friction torque (FreqTrq(n)). More specifically, this section references a table and computes FreqTrq(n) (friction torque) in accordance with Ne (engine speed) and Twn (water temperature) as shown in FIG. 19. Table values for determining FreqTrq(n) should be experimentally determined.

<Actual Increased Engine Speed Computation Section (FIG. 20)>

This computation section computes the actual increased engine speed (dNe(n)). More specifically, this section computes dNe(n)=Ne(n)−Ne(n−1) in accordance with Ne(n) (engine speed computed and updated upon each combustion) as shown in FIG. 20. However, it is assumed that Ne(0)=0 and that dNe(0)=0.

<Target Torque Computation Section 1 (FIG. 21)>

This computation section computes TgTrq1(*n*) (target torque 1 of each combustion). More specifically, this section computes TgTrq1(*n*) (target torque 1 of each combustion) from the equation TgTrq1(*n*)=Ie×TgdNe(n)+FreqTrq(n) in accordance with TgdNe(n) (target increased engine speed of each combustion) and FreqTrq(n) (friction torque) as shown in FIG. 21. Ie is an inertia term (inertia moment) and should be calculated or experimentally determined.

<Target Torque Computation Section 2 (FIG. 22)>

This computation section computes TgTrq2(*n*) (target torque 2 of each combustion). More specifically, this section computes TgTrq2(*n*) (target torque 2 of each combustion) from the equation TgTrq2(*n*)=Ie×e_dNe(n−1)+FreqTrq(n−1) in accordance with e_dNe(n−1) (a target increased engine speed correction value of each combustion) and FreqTrq(n) (friction torque) as shown in FIG. 22. Ie is an inertia term (inertia moment) and should be calculated or experimentally determined. Target torque 2 is determined in accordance with an error between the target and actual increased engine speeds of the previous combustion. In other words, this section attempts to perform a current combustion with a view toward compensating for a control error in the previous combustion. However, the combustion for correcting the error in the previous combustion may not be performed in time during the next combustion cycle due to engine combustion stroke limitations. In such an instance, this section controls a subsequent combustion that can be corrected at the earliest time possible.

<Target Torque Computation Section 3 (FIG. 23)>

This computation section computes TgTrq3 (target torque 3), which is the target torque to be generated after startup. More specifically, this section references a table and computes TgTrq3 in accordance with Apo (accelerator opening) and Ne (engine speed) as shown in FIG. 23. Table values for determining TgTrq3 should be determined in such a manner as to provide a desired torque characteristic.

<Target Air Amount Computation Section (FIG. 24)>

This computation section computes TgTp(n) (target air amount of each combustion). As shown in FIG. 24, when F_sidou=1, that is, when startup control is to be exercised, this section references a table and determines TgTp0(*n*) (target air amount basic value) in accordance with TgTrq(n) (startup target torque). When, on the other hand, F_sidou=0, that is, when post-startup control is to be exercised, this section references a table and determines TgTp0(*n*) (target air amount basic value) in accordance with TgTrq3 (post-startup target torque). Further, this section determines TgTp(n) (target air amount of each combustion) by multiplying TgTp0(*n*) by 1/TgFA (target air excess percentage). The table for determining TgTp0(*n*) should be experimentally prepared. The method for computing TgFA (target equivalence ratio) is not depicted or detailed here because it is well-known (TgFA can be determined, for instance, from an engine operating state).

<Actual Air Amount Computation Section (FIG. 25)>

This computation section computes Tp (actual air amount). More specifically, this section uses the equation shown in FIG. 25 for computation purposes. Cyl represents the number of cylinders. K0 is determined in accordance with injector specifications (the relationship between a fuel injection pulse width and a fuel injection amount).

<Target Throttle Opening/Intake Valve Open/Close Timing Computation Section (FIG. 26)>

This computation section computes TgTV0 (target throttle opening), TgIVO (target intake valve open timing), and TgIVC (target intake valve close timing). More specifically, this section references each table and determines TgTV0, TgIVO, and TgIVC in accordance with TgTp(n) (target air amount) and Ne (engine speed) as shown n FIG. 26. Table values should be determined theoretically or empirically (experimentally) so as to provide manipulative variables for acquiring a desired air amount.

<Fuel Injection Amount Computation Section (FIG. 27)>

This computation section computes TI(n) (fuel injection amount of each combustion). As shown in FIG. 27, when F_sidou=1, that is, when startup control is to be exercised, this section determines TI0(*n*) (fuel injection amount basic value of each combustion) by multiplying TgTp(n) (startup target air amount) by TgFA (target equivalence ratio). When, on the other hand, F_sidou=0, that is, when post-startup control is to be exercised, this section determines TI0(*n*) (fuel injection amount basic value of each combustion) by multiplying Tp(n) (actual air amount) by TgFA (target equivalence ratio). TI(n) (fuel injection amount of each combustion) is determined by subjecting TI0(*n*) to fuel evaporation rate correction and fuel wall flow correction. A process for fuel evaporation rate correction and fuel wall flow correction is not depicted or detailed here because it is not directly related to the present invention and various associated methods have already been proposed.

Second Embodiment

In the first embodiment, the air amount (fuel amount) of each combustion is used to control a startup combustion (engine speed) profile. In a second embodiment, however, ignition timing is used in addition to the air amount (fuel amount) of each combustion to control a startup combustion (engine speed) profile.

FIG. 14 shows a system according to the second embodiment of the present invention. The system is not described in detail here because it is identical with the system according to the first embodiment. FIG. 15 shows the inside of a control unit 16 according to the second embodiment. The control unit 16 is not described in detail here because it is identical with the control unit according to the first embodiment.

Figure 28:
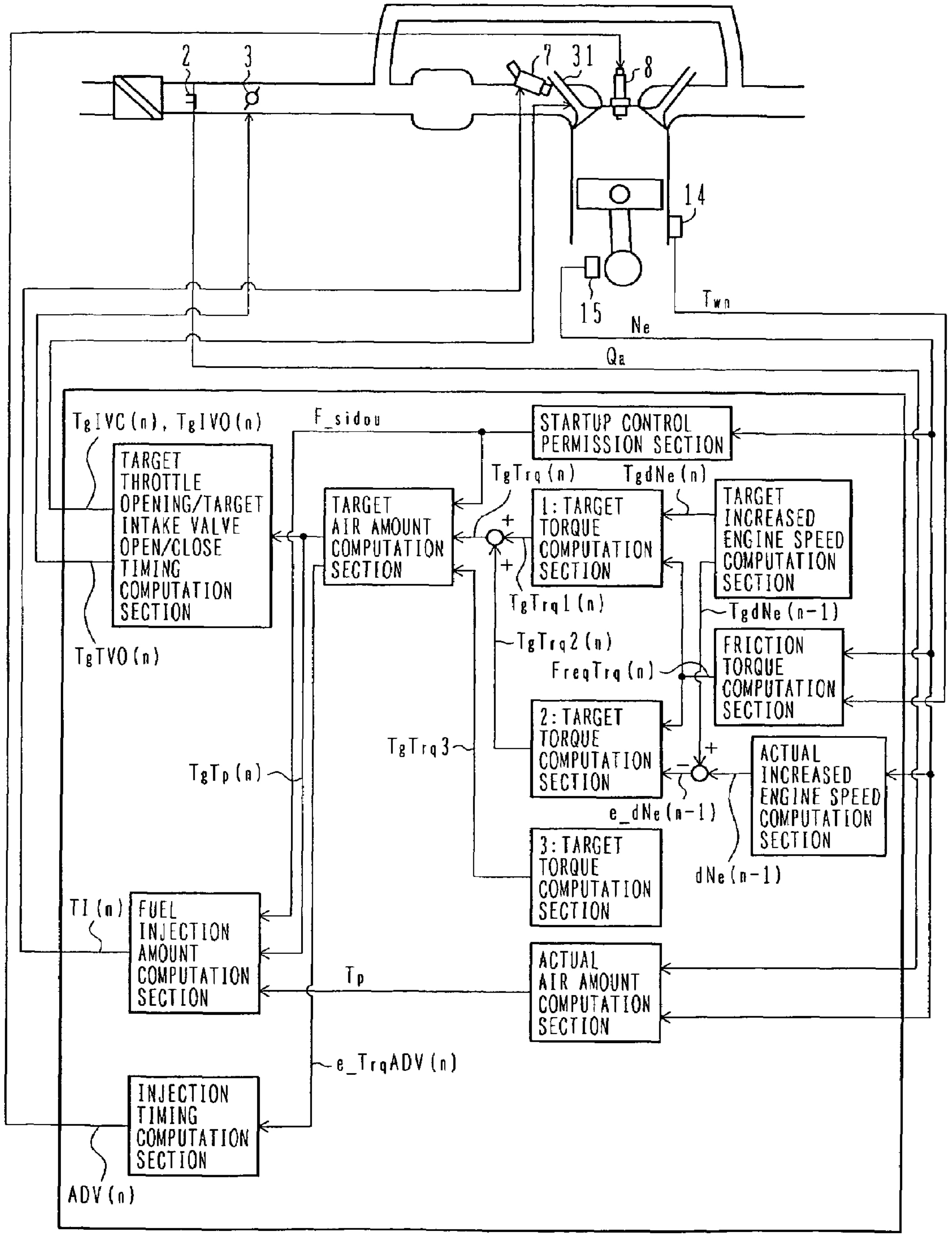
FIG. 28 is a block diagram illustrating an overall control system according to the second embodiment of the present invention.

FIG. 28 is a block diagram illustrating an overall control system. The control system according to the second embodiment is obtained by adding an ignition timing computation section to the control system according to the first embodiment shown in FIG. 16, which is a block diagram illustrating the overall control system according to the first embodiment. The target air amount computation section computes a torque shortfall (e_TrqADV(n)) when the target torque cannot be achieved by the air amount alone because the maximum air amount is exceeded by the target air amount (TgTp(n)) of each combustion. The torque shortfall (e_TrqADV(n)) is offset when a torque generation operation is performed in accordance with ignition timing that is corrected by the ignition timing computation section.

Each control block will be described in detail below.

<Startup Control Permission Section (FIG. 17)>

This section is not described in detail here because it is identical with the counterpart according to the first embodiment, which is shown in FIG. 17.

<Target Increased Engine Speed Computation Section (FIG. 18)>

This section is not described in detail here because it is identical with the counterpart according to the first embodiment, which is shown in FIG. 18.

<Friction Torque Computation Section (FIG. 19)>

This section is not described in detail here because it is identical with the counterpart according to the first embodiment, which is shown in FIG. 19.

<Actual Increased Engine Speed Computation Section (FIG. 20)>

This section is not described in detail here because it is identical with the counterpart according to the first embodiment, which is shown in FIG. 20.

<Target Torque Computation Section 1 (FIG. 21)>

This section is not described in detail here because it is identical with the counterpart according to the first embodiment, which is shown in FIG. 21.

<Target Torque Computation Section 2 (FIG. 22)>

This section is not described in detail here because it is identical with the counterpart according to the first embodiment, which is shown in FIG. 22.

<Target Torque Computation Section 3 (FIG. 23)>

This section is not described in detail here because it is identical with the counterpart according to the first embodiment, which is shown in FIG. 23.

<Target Air Amount Computation Section (FIG. 29)>

Figure 29:
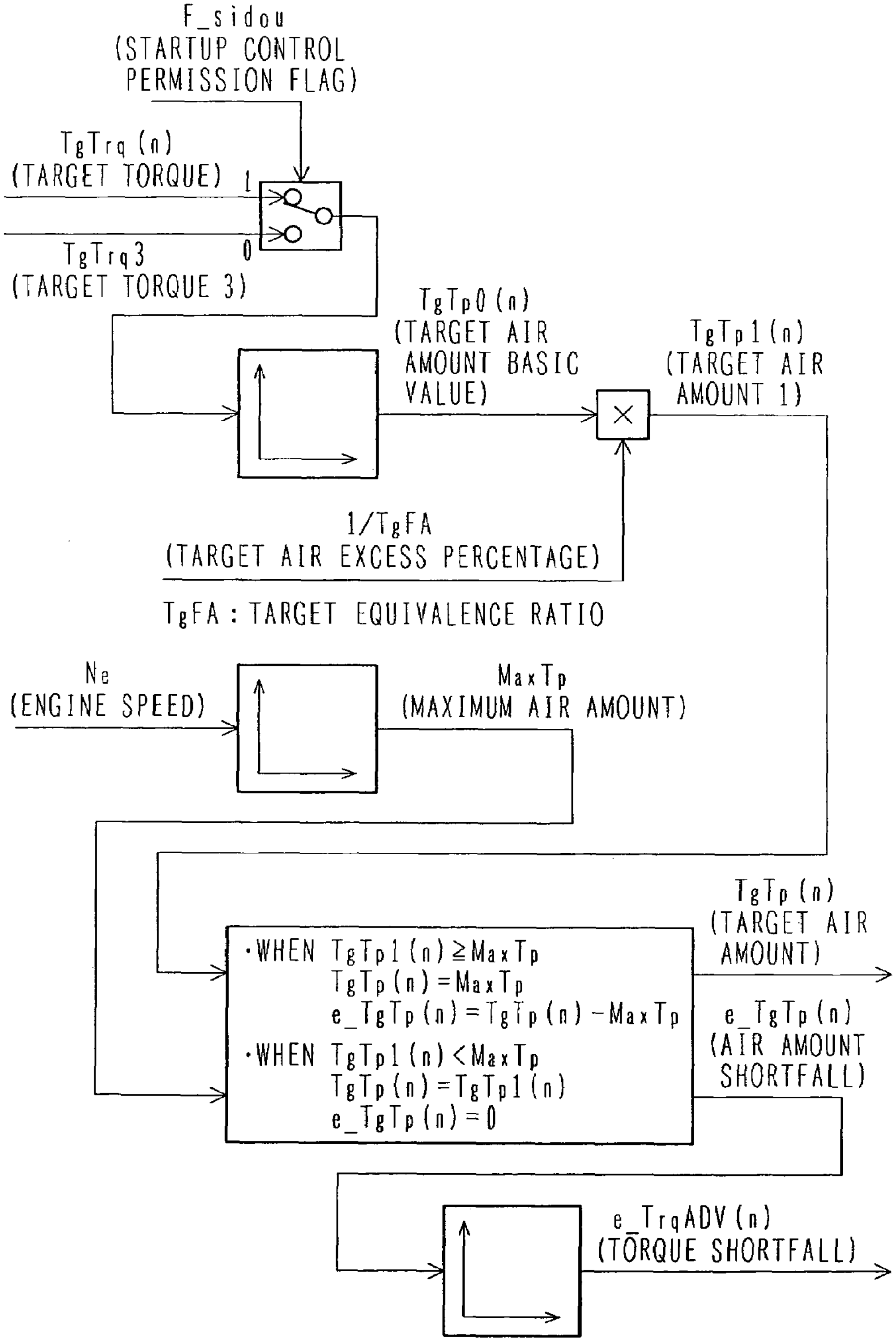
FIG. 29 is a block diagram illustrating a target air amount computation section according to the second, fourth, and fifth embodiments of the present invention.

This computation section computes TgTp(n) (target air amount of each combustion). As shown in FIG. 29, when F_sidou=1, that is, when startup control is to be exercised, this section references a table and determines TgTp0(*n*) (target air amount basic value) in accordance with TgTrq(n) (startup target torque). When, on the other hand, F_sidou=0, that is, when post-startup control is to be exercised, this section references a table and determines TgTp0(*n*) (target air amount basic value) in accordance with TgTrq3 (post-startup target torque). Further, this section determines TgTp1(*n*) (target air amount 1 of each combustion) by multiplying TgTp0(*n*) by 1/TgFA (target air excess percentage). The table for determining TgTp0(*n*) should be experimentally prepared. The method for computing TgFA (target equivalence ratio) is not depicted or detailed here because it is well-known (TgFA can be determined, for instance, from an engine operating state).

The following process is performed on TgTp1(*n*):

When TgTp1(*n*)≧MaxTp

TgTp(n)=MaxTp e_TgTp(n)=TgTp(n)−MaxTp

When TgTp1(*n*)<MaxTp

TgTp(n)=TgTp1(*n*)

e_TgTp(n)=0

MaxTp (maximum air amount) is a maximum intake air amount per cylinder that prevails at a specific engine speed. It is determined from Ne (engine speed) by referencing a table. e_TgTp(n) (air amount shortfall) denotes an air amount shortfall that prevails when the maximum intake air amount does not achieve a target torque. e_TrqADV(n) (torque shortfall), which is to be offset by adjusting the ignition timing, is determined from e_TgTp(n) by referencing a table. The tables should be experimentally prepared.

<Actual Air Amount Computation Section (FIG. 25)>

This section is not described in detail here because it is identical with the counterpart according to the first embodiment, which is shown in FIG. 25.

<Target Throttle Opening/Intake Valve Open/Close Timing Computation Section (FIG. 26)>

This section is not described in detail here because it is identical with the counterpart according to the first embodiment, which is shown in FIG. 26.

<Fuel Injection Amount Computation Section (FIG. 27)>

This section is not described in detail here because it is identical with the counterpart according to the first embodiment, which is shown in FIG. 27.

<Ignition Timing Computation Section (FIG. 30)>

Figure 30:
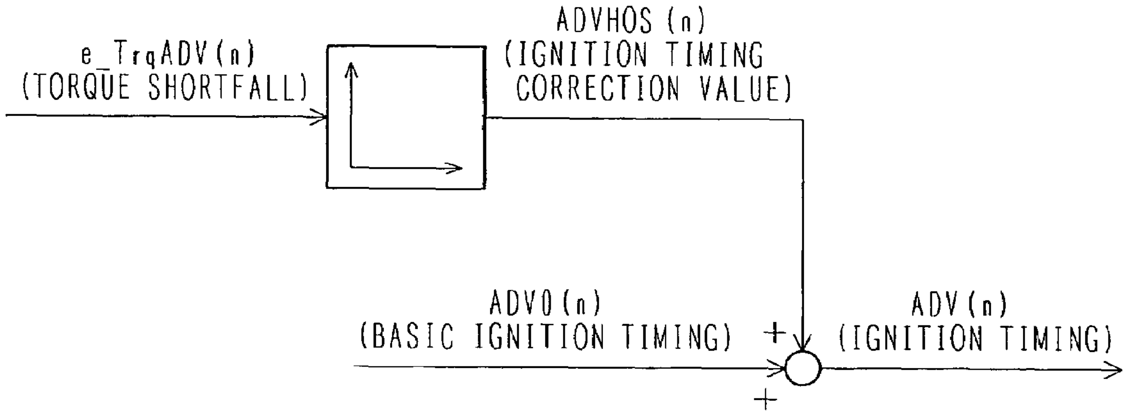
FIG. 30 is a block diagram illustrating an ignition timing computation section according to the second to fifth embodiments of the present invention.

This computation section computes ADV(N) (ignition timing of each combustion). More specifically, this section references a table and determines ADVHOS(n) (ignition timing correction value of each combustion) in accordance with e_TrqADV(n) (torque shortfall) as shown in FIG. 30. ADV(n) (ignition timing of each combustion) is determined by adding ADVHOS(n) to ADV0(*n*) (basic ignition timing). Table values for determining ADVHOS(n) should be experimentally determined. The method for computing ADV0(*n*) (basic ignition timing) is not depicted or detailed here because it is well-known (ADV0(*n*) can be determined, for instance, from an engine operating state) and not directly related to the present invention.

Third Embodiment

The first and second embodiments control the increased engine speed of each combustion. However, a third embodiment of the present invention controls the in-cylinder pressure (indicated mean effective pressure) of each combustion.

FIG. 14 shows a system according to the third embodiment of the present invention. The system is not described in detail here because it is identical with the system according to the first embodiment. FIG. 15 shows the inside of a control unit 16 according to the third embodiment. The control unit 16 is not described in detail here because it is identical with the control unit according to the first embodiment.

Figure 31:
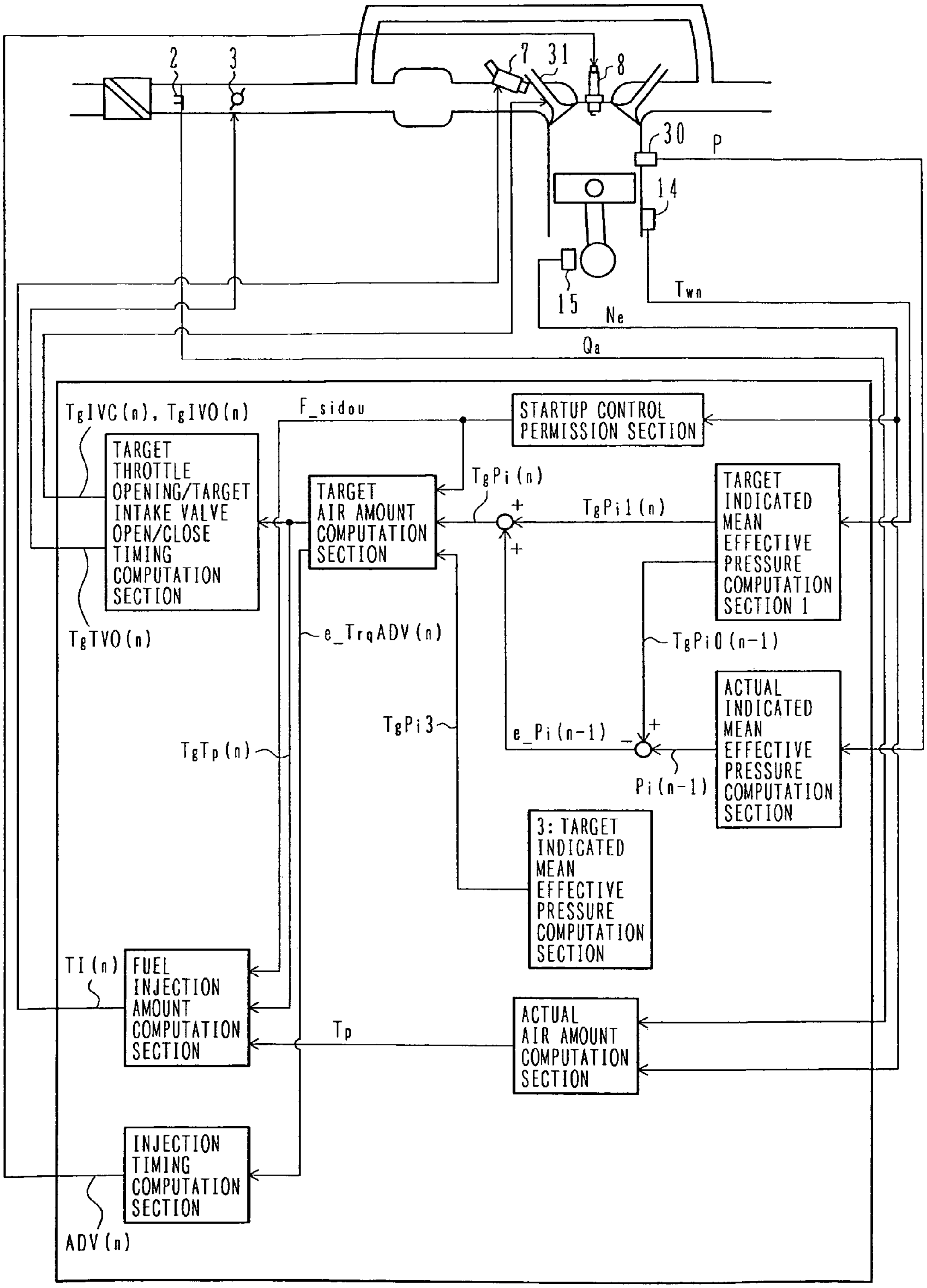
FIG. 31 shows the engine control system according to the third embodiment of the present invention.

FIG. 31 is a block diagram illustrating an overall control system. The control system includes the following computation sections:

- Startup control permission section (FIG. 17)
- Target indicated mean effective pressure computation section 1 (FIG. 32)
- Actual indicated mean effective pressure computation section (FIG. 33)
- Target indicated mean effective pressure computation section 3 (FIG. 34)
- Target air amount computation section (FIGS. 35A and 35B)
- Actual air amount computation section (FIG. 25)
- Target throttle opening/intake valve open/close timing computation section (FIG. 26)
- Fuel injection amount computation section (FIG. 27)
- Ignition timing computation section (FIG. 30)

When startup control is permitted by the startup control permission section (F_sidou=1), target indicated mean effective pressure computation section 1 computes target indicated mean effective pressure 1 (TgPi1(*n*)) of each combustion for startup. It is assumed that the difference between target indicated mean effective pressure 1 (TgPi1(n−1)) and an actual indicated mean effective pressure (Pi(n−1)) computed by the actual indicated mean effective pressure computation section is e_Pi(n−1). It is also assumed that the sum of target indicated mean effective pressure 1 (TgPi1(*n*)) and e_Pi(n−1) is a target indicated mean effective pressure (TgPi(n)) of each combustion for startup. Target indicated mean effective pressure computation section 3 computes target indicated mean effective pressure 3 (TgPi3(*n*)) of a normal operation that is performed when startup control is not permitted (F_sidou=0), that is, performed after startup. The target air amount computation section computes the target air amount (TgTp(n)) of each combustion from the startup target indicated mean effective pressure (TgPi(n)) or normal operation target indicated mean effective pressure 3 (TgPi3(*n*)). The torque shortfall (e_TrqADV(n)) is computed when the target indicated mean effective pressure cannot be achieved by the air amount alone because the maximum air amount is exceeded by the target air amount (TgTp(n)). The target throttle opening/intake valve open/close timing computation section computes the target throttle opening (TgTVO(n)) of each combustion and the intake valve open/close timing (TgIVO(n), TgIVC(n)) of each combustion in accordance with the target air amount (TgTp (n)). The actual air amount computation section computes the actual intake air amount (Tp) per cylinder in accordance, for instance, with the output signal of the air flow sensor 2. The fuel injection amount computation section computes the fuel injection amount (TI(n)) of each combustion in accordance with the target air amount (TgTp(n)) of each combustion when startup control is permitted (F_sidou=1). When, on the other hand, startup control is not permitted (F_sidou=0), that is, when a normal operation is to be performed after startup, the fuel injection amount computation section computes the fuel injection amount (TI) in accordance with the actual intake air amount (Tp). The torque shortfall (e_TrqADV(n)), which is computed by the target air amount computation section, is offset when a torque generation operation is performed in accordance with ignition timing that is corrected by the ignition timing computation section.

Each computation section will be described in detail below.

<Startup Control Permission Section (FIG. 17)>

This section is not described in detail here because it is identical with the counterpart according to the first embodiment, which is shown in FIG. 17.

<Target Indicated Mean Effective Pressure Computation Section 1 (FIG. 32)>

Figure 32:
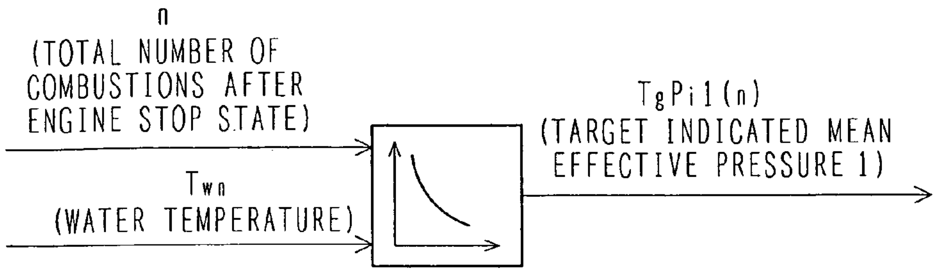
FIG. 32 is a block diagram illustrating target indicated mean effective pressure computation section 1 according to the third embodiment of the present invention.

This computation section computes target indicated mean effective pressure 1 (TgPi1(*n*)) for engine startup. More specifically, this section references a table and computes TgPi1(*n*) in accordance with n (total number of combustions after an engine stop state) and Twn (water temperature) as shown in FIG. 32. Table settings for determining TgPi1(*n*) should be predetermined so as to obtain a desired startup profile. This section references Twn for the purpose of taking a friction torque loss into account.

<Actual Indicated Mean Effective Pressure Computation Section (FIG. 33)>

Figure 33:
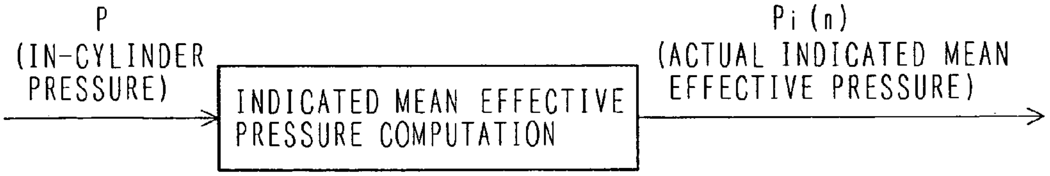
FIG. 33 is a block diagram illustrating an actual indicated mean effective pressure computation section according to the third and fifth embodiments of the present invention.

This computation section computes the actual indicated mean effective pressure (Pi(n)) of each combustion. More specifically, this section computes Pi(n) (actual indicated mean effective pressure) from P (in-cylinder pressure) as shown in FIG. 33. The method for computing the indicated mean effective pressure is not depicted or detailed here because it is well-known and not directly related to the present invention.

<Target Indicated Mean Effective Pressure Computation Section 3 (FIG. 34)>

Figure 34:
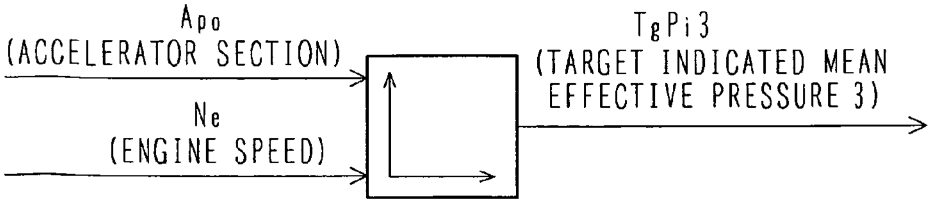
FIG. 34 is a block diagram illustrating target indicated mean effective pressure computation section 3 according to the third embodiment of the present invention.
Figure 35A:
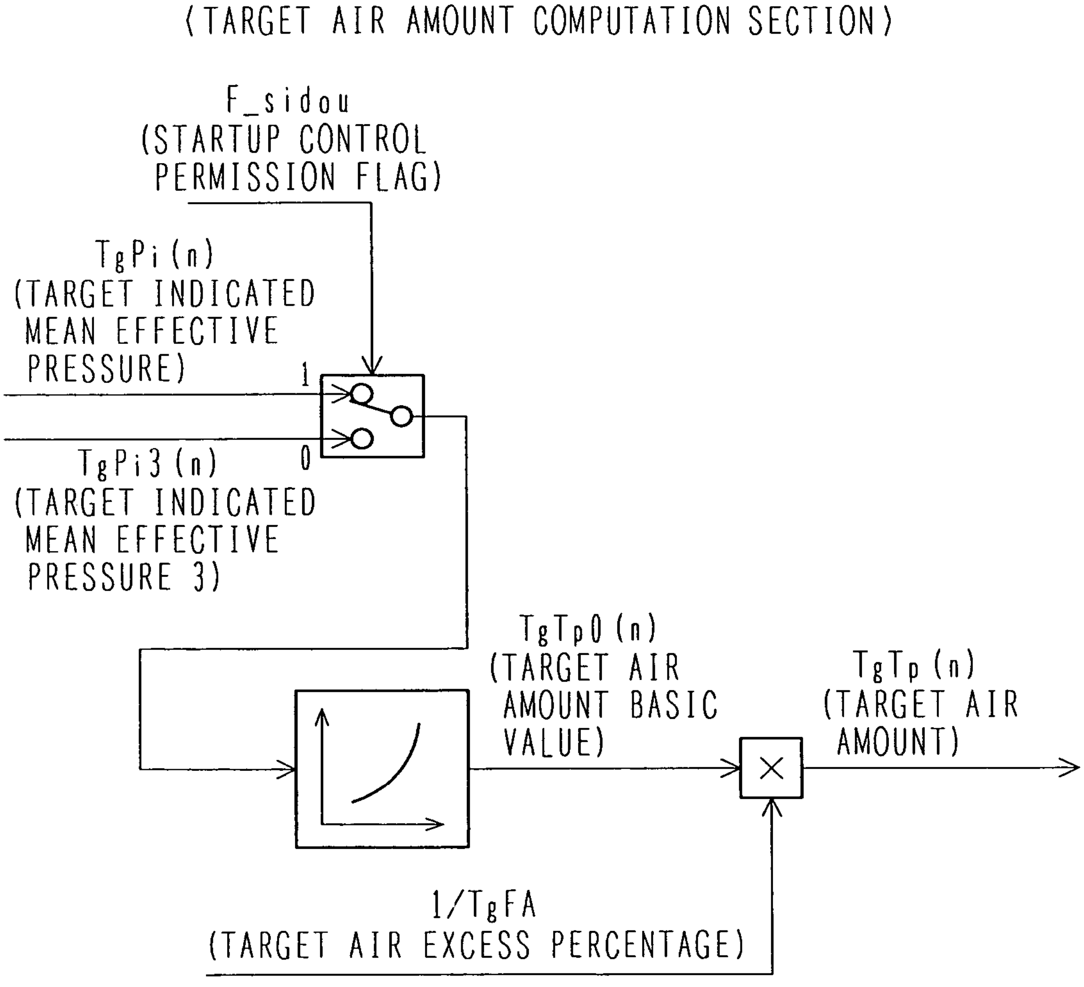
FIGS. 35A and 35B are block diagrams illustrating a target air amount computation section according to the third embodiment of the present invention.
Figure 35B:
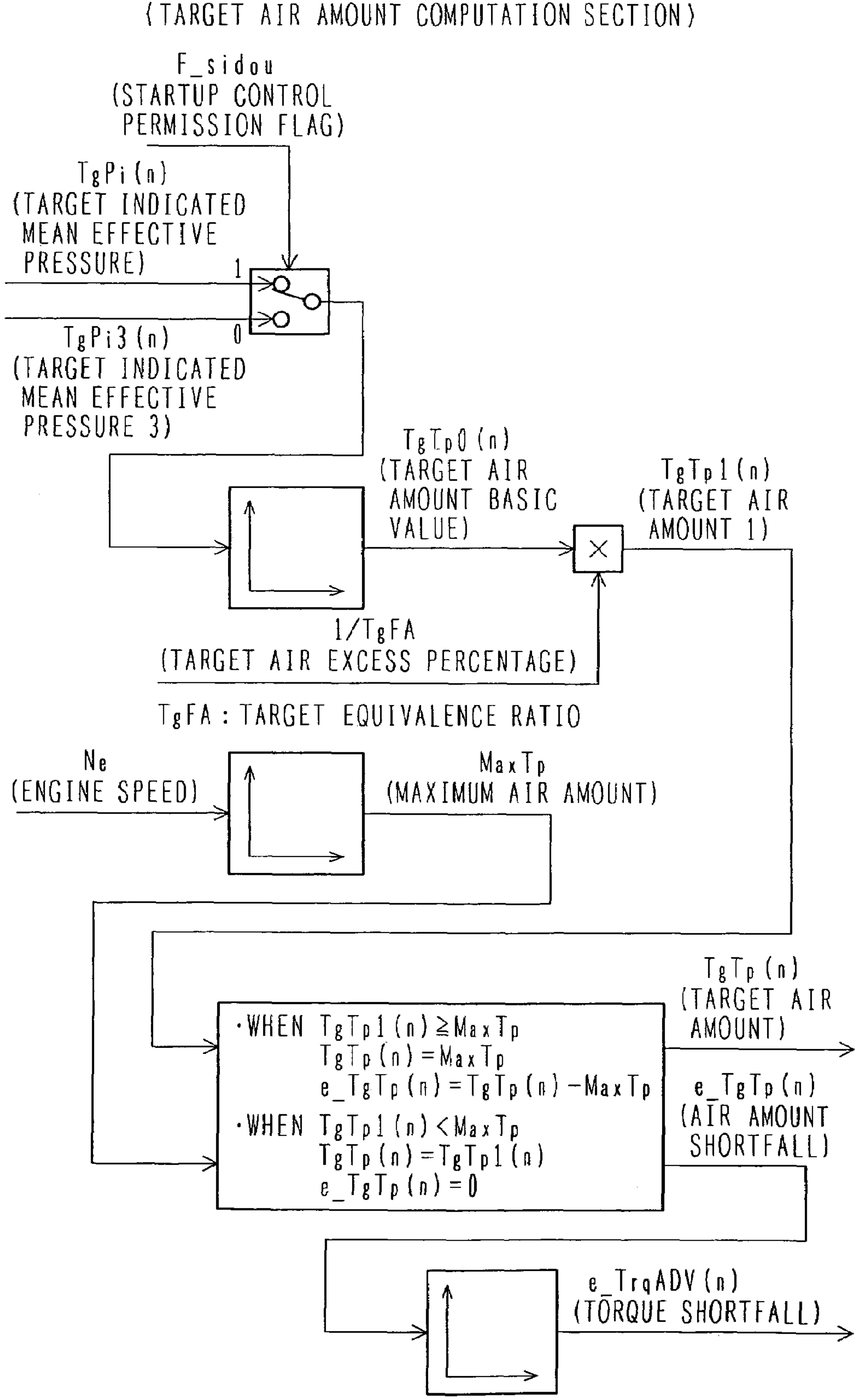

This computation section computes TgPi3, which is a post-startup target indicated mean effective pressure. More specifically, this section references a table and computes TgPi3 in accordance with Apo (accelerator opening) and Ne (engine speed) as shown in FIG. 34. Table values for determining TgPi3 should be determined in such a manner as to provide a desired indicated mean effective pressure characteristic.

<Target Air Amount Computation Section (FIGS. 35A and 35B)>

This computation section computes TgTp(n) (target air amount of each combustion). As shown in FIG. 35, when F_sidou=1, that is, when startup control is to be exercised, this section references a table and determines TgTp0(*n*) (target air amount basic value) in accordance with TgPi(n) (startup target indicated mean effective pressure). When, on the other hand, F_sidou=0, that is, when post-startup control is to be exercised, this section references a table and determines TgTp0(*n*) (target air amount basic value) in accordance with TgPi3 (post-startup indicated mean effective pressure). Further, this section determines TgTp1(*n*) (target air amount 1 of each combustion) by multiplying TgTp0(*n*) by 1/TgFA (target air excess percentage). The table for determining TgTp0 (*n*) should be experimentally prepared. The method for computing TgFA (target equivalence ratio) is not depicted or detailed here because it is well-known (TgFA can be determined, for instance, from an engine operating state).

The following process is performed on TgTp1(*n*):

When TgTp1(*n*)≧MaxTp

TgTp(n)=MaxTp e_TgTp(n)=TgTp(n)−MaxTp

When TgTp1(*n*)<MaxTp

TgTp(n)=TgTp1(*n*)

e_TgTp(n)=0

MaxTp (maximum air amount) is a maximum intake air amount per cylinder that prevails at a specific engine speed. It is determined from Ne (engine speed) by referencing a table. e_TgTp(n) (air amount shortfall) denotes an air amount shortfall that prevails when the maximum intake air amount does not achieve a target torque. e_TrqADV(n) (torque shortfall), which is to be offset by adjusting the ignition timing, is determined from e_TgTp(n) by referencing a table. The tables should be experimentally prepared.

<Actual Air Amount Computation Section (FIG. 25)>

This section is not described in detail here because it is identical with the counterpart according to the first embodiment, which is shown in FIG. 25.

<Target Throttle Opening/Intake Valve Open/Close Timing Computation Section (FIG. 26)>

This section is not described in detail here because it is identical with the counterpart according to the first embodiment, which is shown in FIG. 26.

<Fuel Injection Amount Computation Section (FIG. 27)>

This section is not described in detail here because it is identical with the counterpart according to the first embodiment, which is shown in FIG. 27.

<Ignition Timing Computation Section (FIG. 30)>

This section is not described in detail here because it is identical with the counterpart according to the second embodiment, which is shown in FIG. 30.

Fourth Embodiment

When there is an error between the target increased engine speed and actual increased engine speed, the first and second embodiments convert the error between the target increased engine speed and actual increased engine speed of the last combustion into a torque (target torque 2), add the converted torque to target torque 1, which is determined from only the target increased engine speed, and use the resulting torque as a final target torque. However, a fourth embodiment of the present invention ensures that the error between the target increased engine speed and actual increased engine speed of the last combustion is reflected in the target increased engine speed of a subsequent combustion.

FIG. 14 shows a system according to the fourth embodiment of the present invention. The system is not described in detail here because it is identical with the system according to the first embodiment. FIG. 15 shows the inside of a control unit 16 according to the fourth embodiment. The control unit 16 is not described in detail here because it is identical with the control unit according to the first embodiment.

Figure 36:
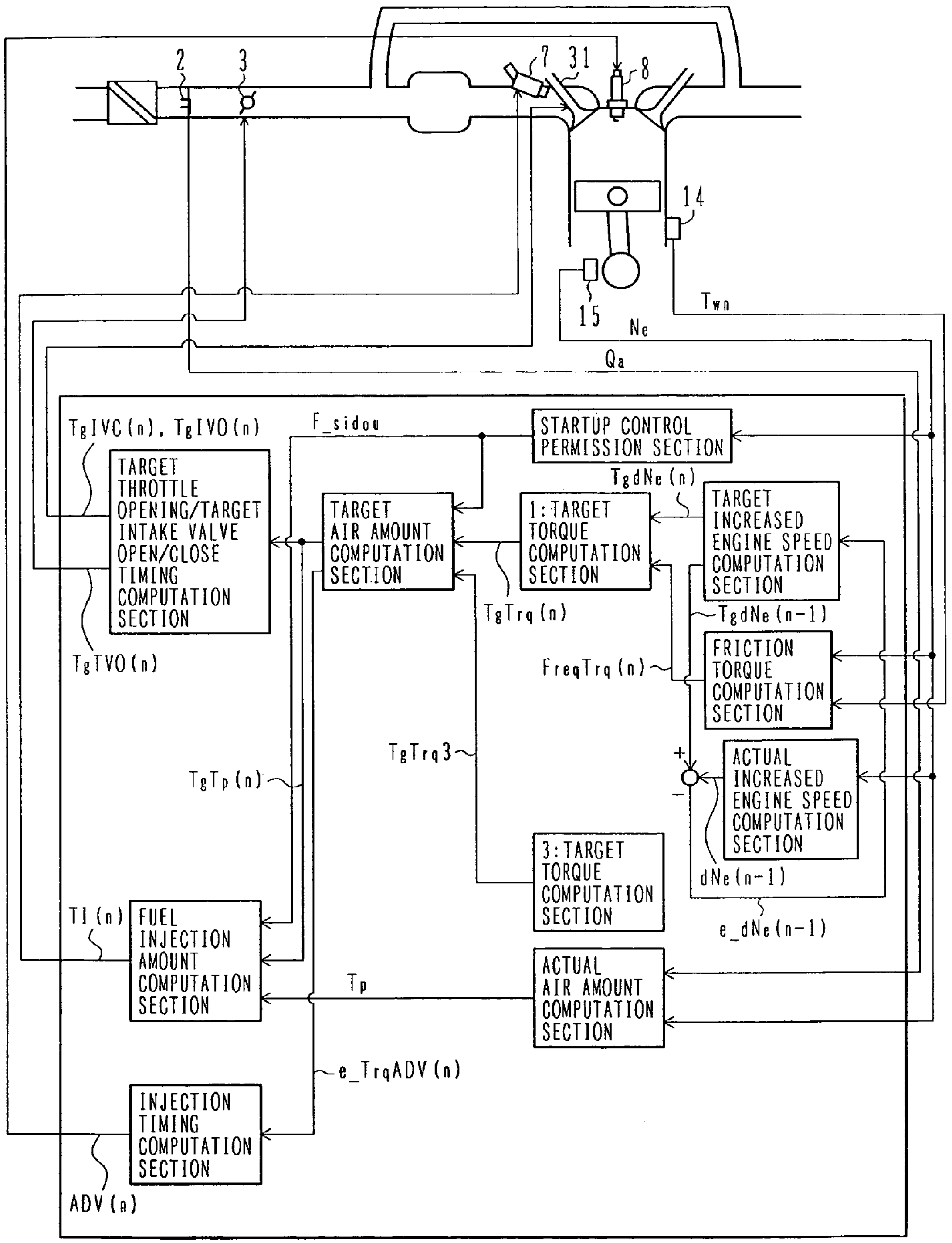
FIG. 36 shows the engine control system according to the fourth embodiment of the present invention.

FIG. 36 is a block diagram illustrating an overall control system. Unlike the control system shown in FIG. 16, which is a block diagram illustrating the overall control system according to the first embodiment, the control system according to the present embodiment ensures that the error (e_dNe (n−1)) between the target increased engine speed (TgdNe(n−1)) and actual increased engine speed (dNe(n−1)) of the last combustion is reflected in the target increased engine speed of a subsequent combustion.

Each control block will be described in detail below.

<Startup Control Permission Section (FIG. 17)>

This section is not described in detail here because it is identical with the counterpart according to the first embodiment, which is shown in FIG. 17.

<Target Increased Engine Speed Computation Section (FIG. 37)>

Figure 37:
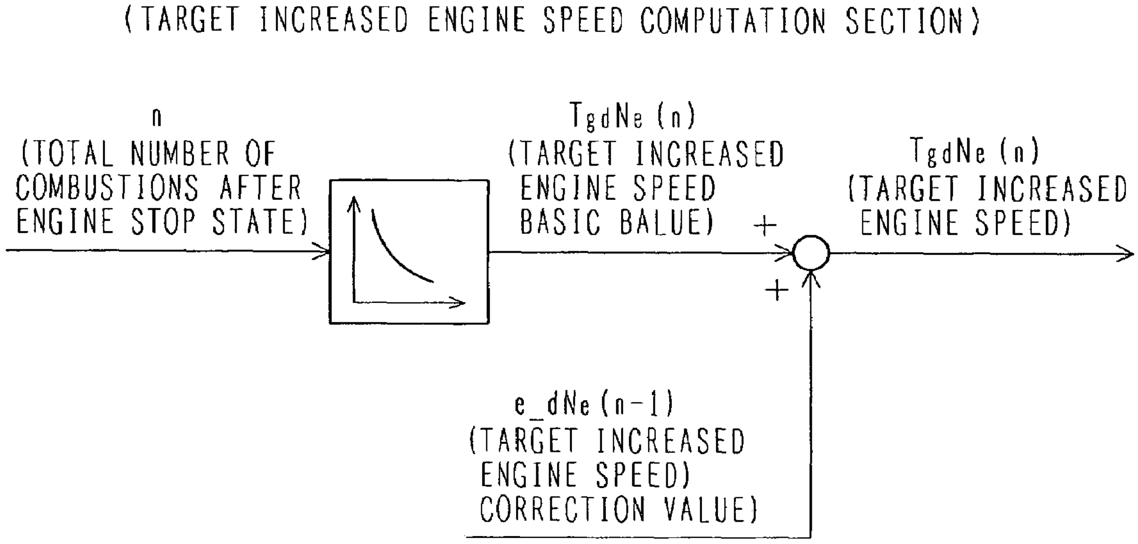
FIG. 37 is a block diagram illustrating the target increased engine speed computation section according to the fourth embodiment of the present invention.

This computation section computes the target increased engine speed (TgdNe(n)) of each combustion for engine startup. More specifically, this section references a table and computes TgdNe0(*n*) (target increased engine speed basic value of each combustion) in accordance with n (total number of combustions after an engine stop state) as shown in FIG. 37. Further, this section determines TgdNe(n) (target increased engine speed of each combustion) by adding e_dNe (n−1) (target increased engine speed correction value) to TgdNe0(*n*). Table settings for determining TgdNe0(*n*) should be predetermined so as to obtain a desired startup profile.

<Friction Torque Computation Section (FIG. 19)>

This section is not described in detail here because it is identical with the counterpart according to the first embodiment, which is shown in FIG. 19.

<Actual Increased Engine Speed Computation Section (FIG. 20)>

This section is not described in detail here because it is identical with the counterpart according to the first embodiment, which is shown in FIG. 20.

<Target Torque Computation Section 1 (FIG. 21)>

This section is not described in detail here because it is identical with the counterpart according to the first embodiment, which is shown in FIG. 21.

<Target Torque Computation Section 3 (FIG. 23)>

This section is not described in detail here because it is identical with the counterpart according to the first embodiment, which is shown in FIG. 23.

<Target Air Amount Computation Section (FIG. 29)>

This section is not described in detail here because it is identical with the counterpart according to the second embodiment, which is shown in FIG. 29.

<Actual Air Amount Computation Section (FIG. 25)>

This section is not described in detail here because it is identical with the counterpart according to the first embodiment, which is shown in FIG. 25.

<Target Throttle Opening/Intake Valve Open/Close Timing Computation Section (FIG. 26)>

This section is not described in detail here because it is identical with the counterpart according to the first embodiment, which is shown in FIG. 26.

<Fuel Injection Amount Computation Section (FIG. 27)>

This section is not described in detail here because it is identical with the counterpart according to the first embodiment, which is shown in FIG. 27.

<Ignition Timing Computation Section (FIG. 30)>

This section is not described in detail here because it is identical with the counterpart according to the second embodiment, which is shown in FIG. 30.

Fifth Embodiment

A fifth embodiment of the present invention estimatingly computes a fuel evaporation rate and friction torque from various startup control parameters and detected values. More specifically, the fifth embodiment estimatingly computes the fuel evaporation rate (fuel property) from the relationship between the target fuel amount and the actual indicated mean effective pressure of a specific combustion as described in the some embodiments of the present invention. Further, the fifth embodiment estimatingly computes the friction torque (internal loss torque) from the relationship between the actual indicated mean effective pressure and actual increased engine speed.

FIG. 14 shows a system according to the fifth embodiment of the present invention. The system is not described in detail here because it is identical with the system according to the first embodiment. FIG. 15 shows the inside of a control unit 16 according to the fifth embodiment. The control unit 16 is not described in detail here because it is identical with the control unit according to the first embodiment.

Figure 38:
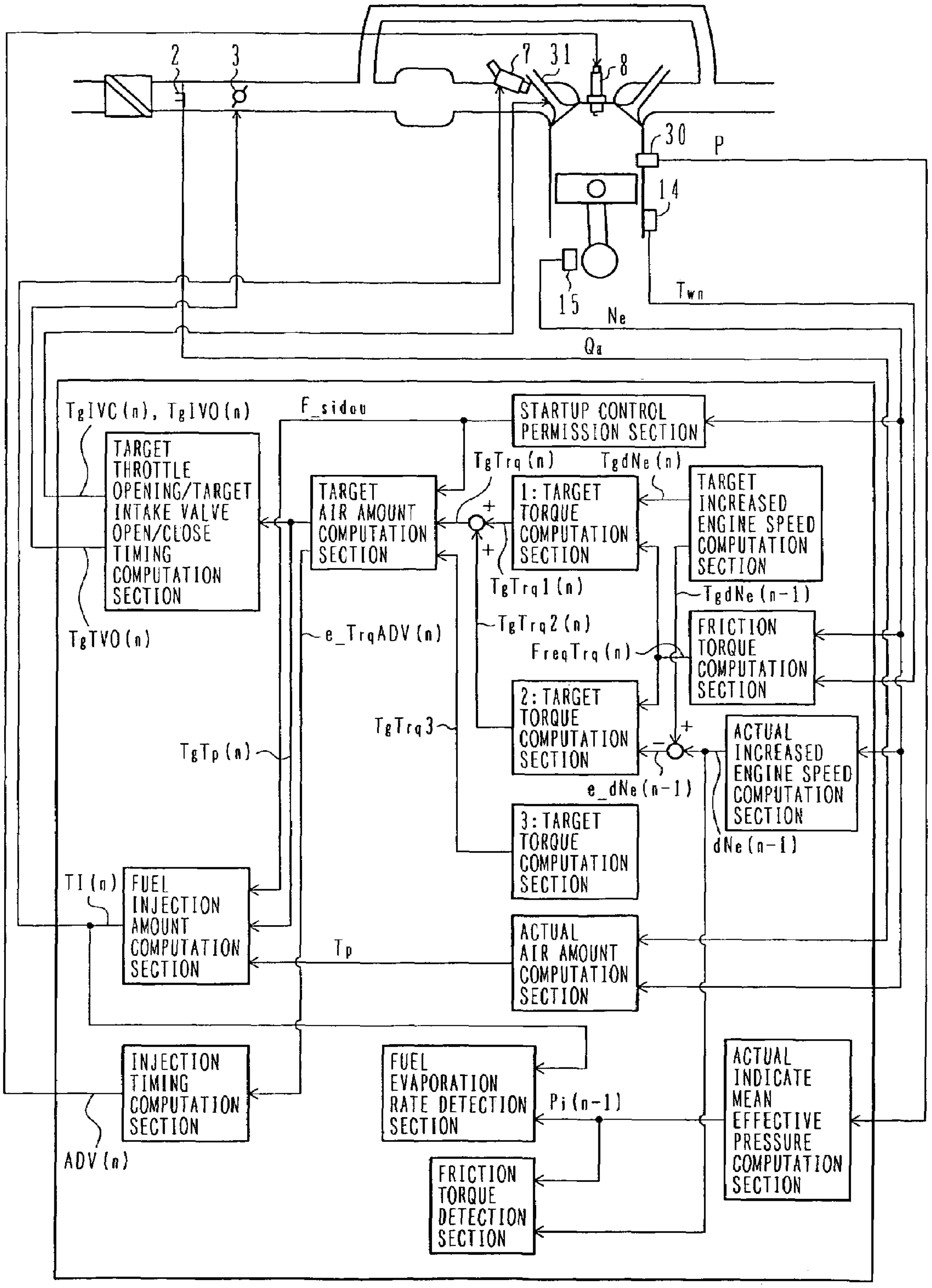
FIG. 38 shows the engine control system according to the fifth embodiment of the present invention.

FIG. 38 is a block diagram illustrating an overall control system. FIG. 38 is associated with a block diagram (FIG. 28) illustrating the overall control system according to the second embodiment as follows:

<Startup Control Permission Section (FIG. 17)>

This section is not described in detail here because it is identical with the counterpart according to the first embodiment, which is shown in FIG. 17.

<Target Increased Engine Speed Computation Section (FIG. 18)>

This section is not described in detail here because it is identical with the counterpart according to the first embodiment, which is shown in FIG. 18.

<Friction Torque Computation Section (FIG. 19)>

This section is not described in detail here because it is identical with the counterpart according to the first embodiment, which is shown in FIG. 19.

<Actual Increased Engine Speed Computation Section (FIG. 20)>

This section is not described in detail here because it is identical with the counterpart according to the first embodiment, which is shown in FIG. 20.

<Target Torque Computation Section 1 (FIG. 21)>

This section is not described in detail here because it is identical with the counterpart according to the first embodiment, which is shown in FIG. 21.

<Target Torque Computation Section 2 (FIG. 22)>

This section is not described in detail here because it is identical with the counterpart according to the first embodiment, which is shown in FIG. 22.

<Target Torque Computation Section 3 (FIG. 23)>

This section is not described in detail here because it is identical with the counterpart according to the first embodiment, which is shown in FIG. 23.

<Target Air Amount Computation Section (FIG. 29)>

This section is not described in detail here because it is identical with the counterpart according to the second embodiment, which is shown in FIG. 29.

<Actual Air Amount Computation Section (FIG. 25)>

This section is not described in detail here because it is identical with the counterpart according to the first embodiment, which is shown in FIG. 25.

<Target Throttle Opening/Intake Valve Open/Close Timing Computation Section (FIG. 26)>

This section is not described in detail here because it is identical with the counterpart according to the first embodiment, which is shown in FIG. 26.

<Fuel Injection Amount Computation Section (FIG. 27)>

This section is not described in detail here because it is identical with the counterpart according to the first embodiment, which is shown in FIG. 27.

<Ignition Timing Computation Section (FIG. 30)>

This section is not described in detail here because it is identical with the counterpart according to the second embodiment, which is shown in FIG. 30.

<Actual Indicated Mean Effective Pressure Computation Section (FIG. 33)>

This section is not described in detail here because it is identical with the counterpart according to the third embodiment, which is shown in FIG. 33.

<Fuel Evaporation Rate Detection Section (FIG. 39)>

Figure 39:
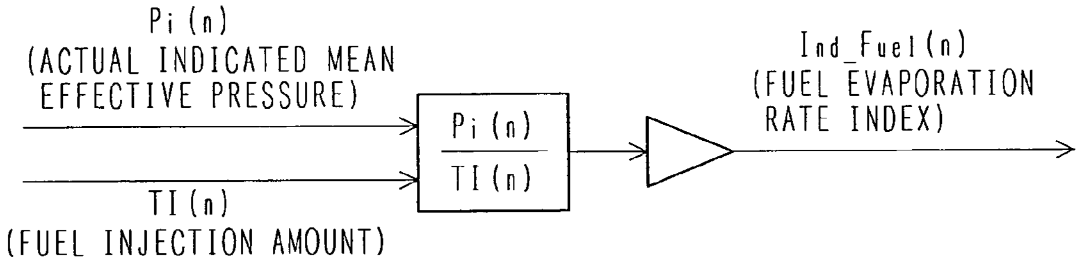
FIG. 39 is a block diagram illustrating a fuel evaporation rate detection section according to the fifth embodiment of the present invention.

This detection section detects the fuel evaporation rate. More specifically, this section computes Ind_Fuel(n) (fuel evaporation rate index) by multiplying the ratio between TI(n) (fuel injection amount of each combustion) and Pi(n) (actual indicated mean effective pressure of a specific combustion) by a predetermined gain as shown in FIG. 39. Further, this section uses the fuel evaporation rate index, for instance, to estimate the fuel property and optimize engine control parameters (fuel injection amount, fuel evaporation rate, etc.). A technology for optimizing the engine control parameters in accordance with the fuel evaporation rate (fuel property) is not depicted or detailed here because it is not directly related to the present invention and there are a variety of known technologies and associated proposed methods.

<Friction Torque Detection Section (FIG. 40)>

Figure 40:
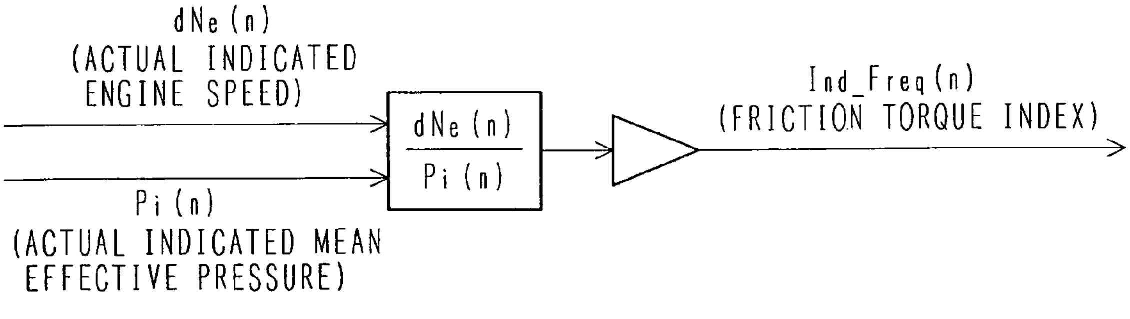
FIG. 40 is a block diagram illustrating a friction torque detection section according to the fifth embodiment of the present invention.

This detection section detects the friction torque. More specifically, this section computes Ind_Freq(n) (friction torque index) by multiplying the ratio between Pi(n) (actual indicated mean effective pressure of each combustion) and dNe(n) (actual increased engine speed) by a predetermined gain as shown in FIG. 40. The friction torque index may be used to determine the friction torque and let the friction torque computation section according to the first, second, or fourth embodiment make friction torque on-line correction. The friction torque index may also be used to provide torque control. The procedure for applying the friction torque index to torque control is not depicted or detailed here because it is not directly related to the present invention and there are a variety of known technologies and associated proposed methods.

As mentioned earlier, the present embodiment assumes that table settings for determining TgdNe(n) should be predetermined so as to obtain a desired startup profile. However, the table settings may be determined by solving an optimization problem such as an optimal regulator problem for modern control. An alternative method would be to provide successive onboard optimization by subjecting startup profiles of various control parameters (air amount, fuel injection amount, ignition timing, etc.) and detected values (increased engine speed, in-cylinder pressure, etc.) to adaptive control. The optimization problem (optimal regulator problem) and adaptive control are not described in detail here because a number of associated books and documents are available.

At startup, the present embodiment determines the fuel injection amount in accordance with the target air amount. However, it is possible to start using the actual air amount immediately after startup depending on the employed air flow sensor.

Further, the present embodiment assumes that the present invention is applied to an engine. However, the present invention can also be applied to a hybrid engine that combines an engine and a motor. In such an application, for example, the torque for attaining a target increased rotation speed may be generated in a shared manner by the engine and motor while allowing the motor, which has high control accuracy, to correct an error in an actual increased rotation speed.

What is claimed is:

1. An engine control device for starting an engine, comprising:

means for setting a target engine operating state of each combustion;

means for detecting an actual engine operating state of each combustion, which results when the engine is controlled to obtain the target engine operating state; and means for computing a control parameter for at least one subsequent combustion in accordance with the target engine operating state and the actual engine operating state.

2. The engine control device according to claim 1, wherein a combination of the target engine operating state and the actual engine operating state is at least one of a combination of a target increased engine speed and an actual increased engine speed, a combination of a target torque and an actual torque, a combination of a target in-cylinder pressure and an actual in-cylinder pressure, and a combination of a target air amount and an actual air amount.

3. The engine control device according to claim 1, wherein the control parameter to be computed is at least one of an intake air amount, a fuel injection amount, ignition timing, intake/exhaust valve open/close timing, and an intake/exhaust valve lift amount.

4. The engine control device according to claim 1, wherein said means for computing the control parameter computes the control parameter from engine control parameter 1, which is derived from the target engine operating state, and engine control parameter 2, which is derived from the target engine operating state and the actual engine operating state.

5. The engine control device according to claim 1, wherein the control parameter is computed in accordance with the difference between the target engine operating state of each combustion and the actual engine operating state of each combustion.

6. The engine control device according to claim 1, further comprising:

means for predefining a target engine operating state of each combustion for switching to a predetermined engine operating state from an engine stop state within a predetermined period of time.

7. The engine control device according to claim 6, further comprising:

means for predefining a target increased engine speed of each combustion for attaining a predetermined engine speed from an engine stop state within a predetermined period of time.

8. The engine control device according to claim 7, further comprising:

means for changing a predetermined target increased engine speed of each subsequent combustion in accordance with the actual increased engine speed of each combustion.

9. The engine control device according to claim 8, wherein the means for changing the predetermined target increased engine speed of each subsequent combustion changes the target increased engine speed of each subsequent combustion so that a predetermined engine speed is attained within a predetermined period of time.

10. The engine control device according to claim 7, further comprising:

means for changing the target increased engine speed of a subsequent combustion to a value higher than the predefined target increased engine speed when the actual increased engine speed is lower than the target increased engine speed.

11. The engine control device according to claim 7, further comprising:

means for changing the target increased engine speed of a subsequent combustion to a value lower than the predefined target increased engine speed when the actual increased engine speed is higher than the target increased engine speed.

12. The engine control device according to claim 1, further comprising:

means for setting the target increased engine speed of each subsequent combustion in accordance with the target increased engine speed of each combustion and the actual increased engine speed of each combustion; and means for computing the target torque of each subsequent combustion or the target air amount of each subsequent combustion from the target increased engine speed of each subsequent combustion.

13. The engine control device according to claim 12, wherein a target air amount, a target fuel injection amount, target ignition timing, target intake/exhaust valve open/close timing, or a target intake/exhaust valve lift amount is computed in accordance with the target torque of each subsequent combustion.

14. The engine control device according to claim 12, further comprising:

means for computing a target torque of each subsequent combustion in accordance with the target increased engine speed of each subsequent combustion and at least engine rotational inertia torque and/or friction torque.

15. The engine control device according to claim 1, further comprising:

means for computing in-cylinder pressure or indicated mean effective pressure of a combustion from an intake air amount per cylinder of the combustion and a target fuel amount or a target air-fuel ratio per cylinder of the combustion; and means for computing friction torque from the in-cylinder pressure or the indicated mean effective pressure and an actual increased engine speed of the combustion.

16. The engine control device according to claim 1, further comprising:

means for estimating a fuel evaporation rate or a fuel property of a combustion from an intake air amount per cylinder of the combustion, a target fuel amount or a target air-fuel ratio per cylinder of the combustion, and actual in-cylinder pressure or actual indicated mean effective pressure of the combustion; and means for computing friction torque from the actual in-cylinder pressure or the actual indicated mean effective pressure and an actual increased engine speed of the combustion.

17. The engine control device according to claim 1, wherein control is exercised over the first combustion upon engine startup and a predetermined number of subsequent combustions.

18. The engine control device according to claim 1, wherein the actual engine speed reaches a predetermined engine speed within a predetermined period of time after engine stoppage no matter whether fuel property, combustion efficiency, friction, atmospheric pressure, ambient temperature, or other environmental condition is changed.

* * * * *